United States Patent

Bugno et al.

[11] Patent Number: 6,140,933
[45] Date of Patent: *Oct. 31, 2000

[54] REARVIEW MIRROR ASSEMBLY WITH INTERNALLY MOUNTED COMPASS SENSOR

[75] Inventors: Mark D. Bugno, Stevensville; Jon H. Bechtel, Holland; Frederick T. Bauer, Holland; Donald L. Tapley, Holland; Timothy A. Bonardi, Buchanan; Robert R. Turnbull, Holland, all of Mich.

[73] Assignee: Gentex Corporation, Zeeland, Mich.

[ * ] Notice: This patent is subject to a terminal disclaimer.

[21] Appl. No.: 09/432,939

[22] Filed: Nov. 3, 1999

Related U.S. Application Data

[63] Continuation-in-part of application No. 09/260,267, Mar. 2, 1999, Pat. No. 6,023,229.

[51] Int. Cl.⁷ .................................................. G08B 23/00
[52] U.S. Cl. ...................... 340/693.5; 340/440; 340/438; 33/355 R; 33/356; 33/333
[58] Field of Search .............................. 340/693.5, 693.9, 340/693.12, 438, 440, 689; 33/355 R, 356, 361, 333

[56] References Cited

U.S. PATENT DOCUMENTS

| | | | |
|---|---|---|---|
| 4,581,827 | 4/1986 | Higashi | 33/333 |
| 5,339,529 | 8/1994 | Lindberg | 33/355 R |
| 5,455,716 | 10/1995 | Suman et al. | 359/838 |
| 5,644,851 | 7/1997 | Blank et al. | 33/361 |
| 5,699,044 | 12/1997 | Van Lente et al. | 340/525 |
| 5,708,410 | 1/1998 | Blank et al. | 340/438 |
| 5,737,226 | 4/1998 | Olson et al. | 364/457 |
| 5,802,727 | 9/1998 | Blank et al. | 33/361 |
| 5,808,197 | 9/1998 | Dao | 43/514.09 |
| 6,023,229 | 2/2000 | Bugno et al. | 340/693.5 |

OTHER PUBLICATIONS

U.S. Patent Application No. 07/279,643 filed on Dec. 5, 1988.

*Primary Examiner*—Daniel J. Wu
*Assistant Examiner*—Sihong Huang
*Attorney, Agent, or Firm*—Price, Heneveld, Cooper, DeWitt & Litton; Brian J. Rees

[57] ABSTRACT

A rearview mirror assembly is disclosed for use in a vehicle that includes a mirror housing, a mounting structure for pivotally mounting the mirror housing to the vehicle such that the mirror housing may be both vertically and horizontally tilted, a compass sensor disposed in the mirror housing and coupled to a compass processing circuit, and a tilt detector for detecting when the mirror housing has been tilted from a prior position and for generating and transmitting a tilt detection signal to the compass processing circuit. The compass processing circuit may then respond to the reception of the tilt detecting signal by compensating the compass reading and/or display or by recalibrating the compass. The compass may be recalibrated using a variety of techniques, which may include, for example, comparing the sensor output values immediately prior and immediately after a tilt detection signal has been received and adjusting the calibration point by an amount corresponding to any difference between the sensor output levels.

38 Claims, 12 Drawing Sheets

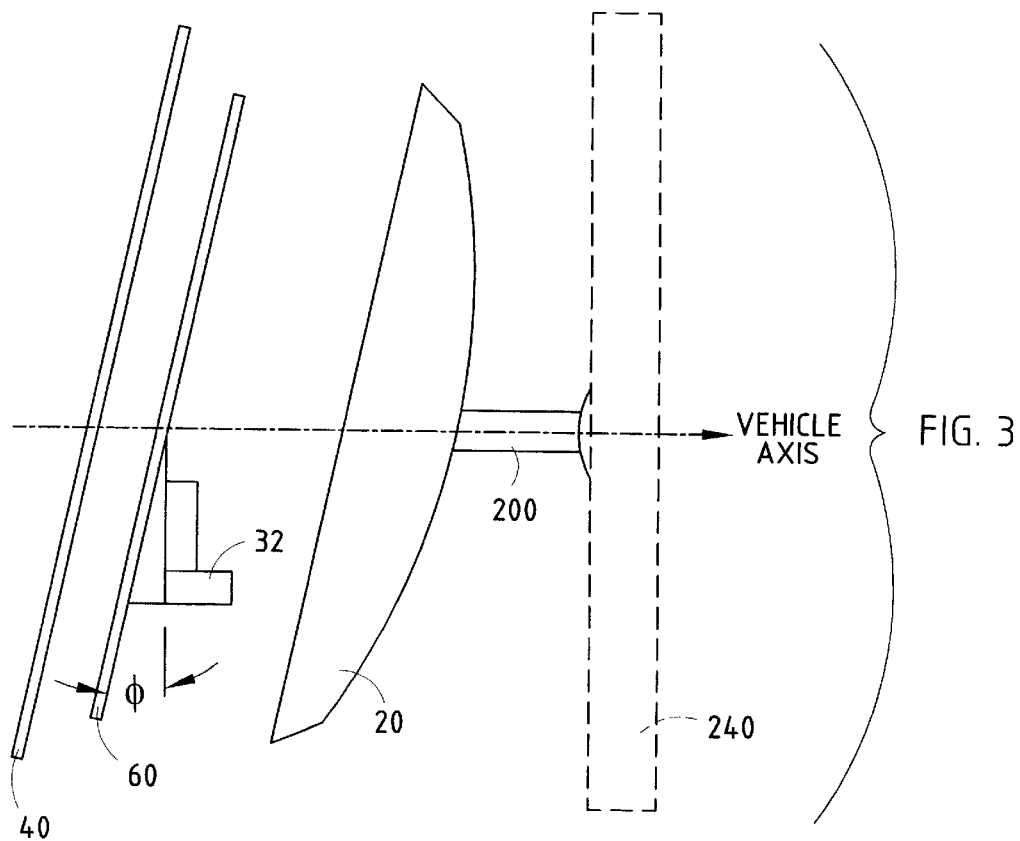
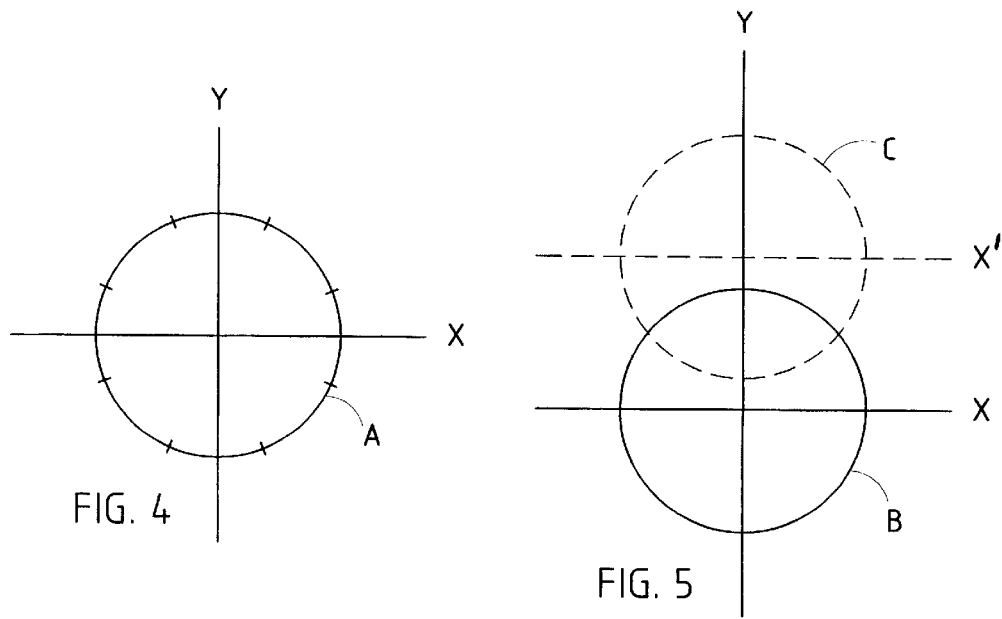

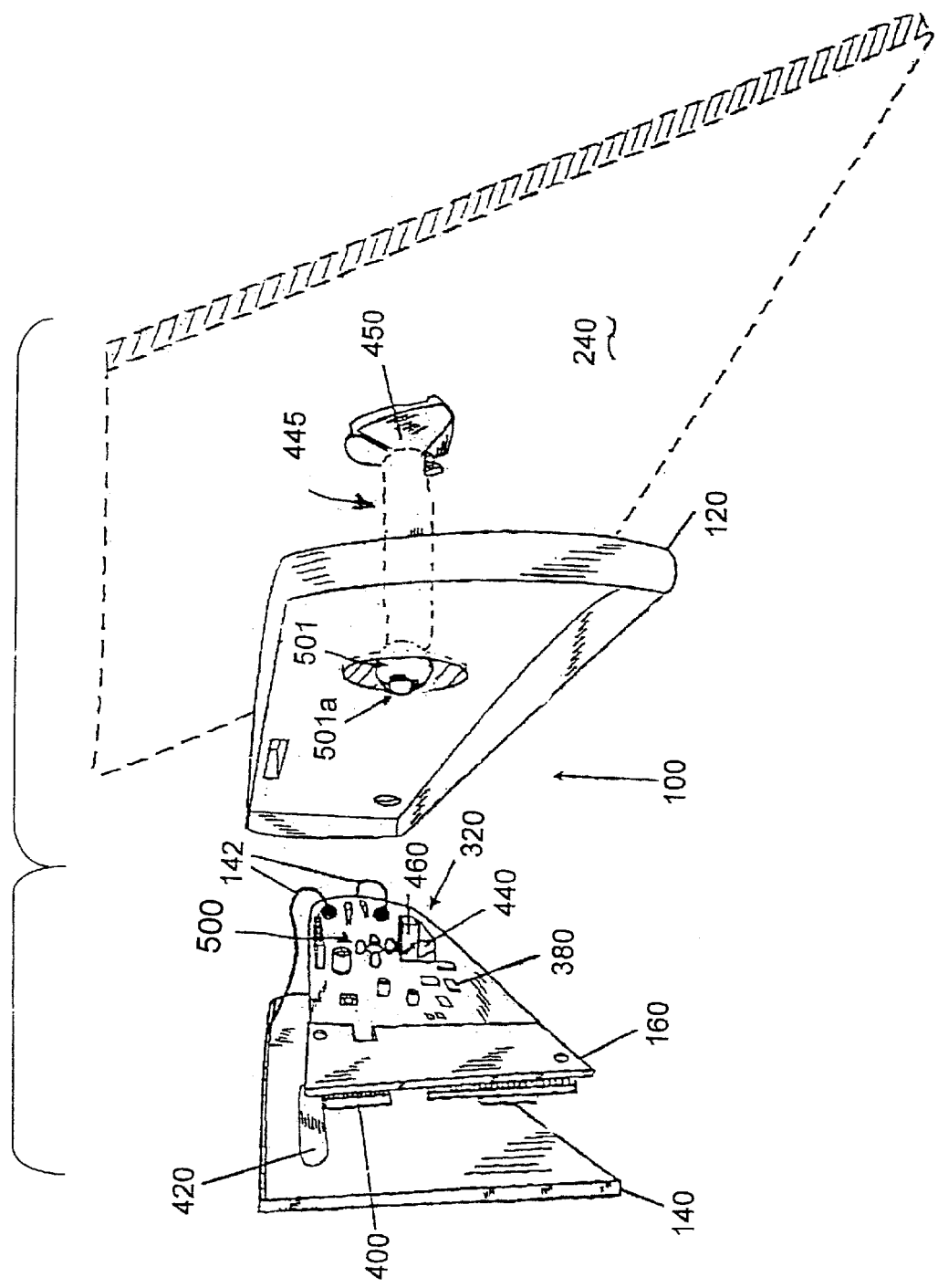

REARVIEW MIRROR ASSEMBLY WITH INTERNALLY MOUNTED COMPASS SENSOR

CROSS-REFERENCE TO RELATED APPLICATIONS

This application is a continuation-in-part of U.S. patent application Ser. No. 09/260,267, entitled REARVIEW MIRROR WITH INTERNALLY-MOUNTED COMPASS SENSOR, filed on Mar. 2, 1999, now U.S. Pat. No. 6,023,229. Priority under 35 U.S.C. §120 is hereby claimed on the above-identified patent application. The entire disclosure of the above application is incorporated herein by reference.

BACKGROUND OF THE INVENTION

The present invention generally relates to vehicle rearview mirror assemblies, and more particularly relates to rearview mirror assemblies that incorporate some component of an electronic compass.

It is known to associate compass systems with rearview mirrors in vehicles. FIG. 1 illustrates an example of a known rearview mirror assembly incorporating such a compass system. The mirror assembly 10 comprises an open-faced mirror housing 12, a mirror 14, and a circuit board 16. Mirror 14 includes an electrochronic element driven by a driving circuit 18 for automatically changing mirror reflectance as a function of glare. It will be understood that, as typically, mirror 14 can be a simple plain mirror with a prism mechanism (not shown) to enable reduction of nighttime glare.

Housing 12 is mounted to the vehicle by way of a pivot connection 20 and a bracket housing 22. In FIG. 1, mirror housing 12 is shown mounted to bracket housing 22 on a windshield 24 of the vehicle as in the case of an interior rearview mirror assembly. Pivot connection 20 shown in FIG. 1 comprises a ball 26 fixedly mounted to mirror housing 12 and pivotally mounted in a socket of a spacer 28. The other end of spacer 28 carries a socket which receives another ball 30 which is fixedly secured to bracket housing 22. It can be seen that the typical mirror housing 12 is thus pivotable relative to the vehicle windshield 24 by manually rotating either of the balls 26, 30 in their respective sockets. It is also known to use a single ball and socket pivot to mount a mirror housing to a vehicle. Further, it is known to incorporate a motorized actuating mechanism in the housing 12 wherein the housing can be pivoted relative to the vehicle by remote actuation of a switch.

The compass system of FIG. 1 comprises a magnetic field sensor 32 mounted in bracket housing 22 for detecting the earth's magnetic field and for providing electrical signals representative of the magnetic field to circuit board 16 through a wire 34 to circuit board 16. Connector 36 on circuit board 16 extends into an aperture 37 in mirror housing 12 to deliver power and signals to and from other mirror system components. Wire 34 extends through a notch in aperture 37 to a connector 45 on circuit board 16. Circuit board 16 carries a processing circuit 38 that processes signals from sensor 32 and provides a representative output signal to a display 40 that displays the vehicle's heading. In the example of FIG. 1, display 40 can be visually seen by an observer through a transparent window 42 in mirror 14. The display may be mounted either behind the mirror element or in an area adjacent to and offset from the mirror element. Alternatively, the display may be located elsewhere in the vehicle, such as an overhead console, instrument panel, A-pillar, etc.

Magnetic field sensor 32 comprises an X-axis sensor 44, perpendicular to the vehicle's direction of travel, and a Y axis sensor 46, in line with the vehicle's direction of travel. Moreover, both sensors 44, 46 are mounted parallel with the earth's surface. In other words, magnetic field sensor 32 is fixed relative to the vehicle. Magnetic field sensor 32 is typically a flux-gate sensor, although other types of magnetic field sensors are in known use, such as magneto-resistive and magneto-inductive sensors.

In such constructions, the compass sensing circuit elements that sense magnetic field components of the earth's magnetic field are typically mounted a separate housing attached to a foot portion of the mirror mounting bracket or in another area of the vehicle altogether, such as the overhead console. Mounting the sensors in the foot of the mirror mounting bracket has been preferred due to the low levels of magnetic interference that may be present in other vehicle locations. The problem with mounting magnetic sensors at the foot of the mirror mounting bracket is that the foot portion becomes much larger and hence may block a more significant amount of the driver's field of view through the windshield. Also, for electrochromic mirrors, a large bracket housing reduces the light level reaching the ambient sensor aperture in the mirror housing. Another problem is that the foot portion of the mirror may be more suitable for mounting of other components, such as rain sensors or a GPS antenna as disclosed in commonly-assigned U.S. patent application Ser. No. 09/250,086.

Because the compass display is commonly mounted in the mirror housing, it has typically been desirable to also mount the compass processing circuit in the housing along with the display and its associated circuitry. Thus, it is also beneficial to mount the compass magnetic field sensors in close proximity to the compass processing circuit so as to avoid the need of running excess wiring between the sensors and the processing circuit. Moreover, remote mounting of the magnetic field sensors from the processing circuit introduces noise into the system due to electromagnetic interference (EMI) picked up by the wire harness from other nearby electronic circuits. To reduce the EMI noise introduced between the sensors and the processing circuit, EMI filters are required. Also, the wire harness itself tends to radiate EMI emissions that may introduce noise to the vehicle's radio. The wire harness, connectors, sensor housing, and EMI filters all add cost to the mirror itself while also increasing the complexity and cost of installing the mirror assemblies in vehicles.

While the inside of the mirror housing would appear to be the most desirable location for the sensors so as to provide all the components of the compass in a single location while also freeing up the area at the foot of the rearview mirror mounting bracket for other components, the mounting of the compass sensors in the rearview housing has presented major problems that have a significant impact upon the accuracy of the compass. Specifically, rearview mirror housings are mounted to a vehicle so as to be both vertically and horizontally pivotable about one or more universal ball joints provided on the mounting bracket or on the back of the mirror. Such pivotable movement is necessary so as to accommodate drivers of different sizes and to allow drivers to adjust the mirror in accordance with any adjustments in their seat position so as to have a clear view out the rear window of the vehicle. Such movement of the mirror housing correspondingly causes movement of the magnetic field sensors of the compass sensing circuitry. Such movement of the compass sensors can produce a rather significant error in the vehicle heading information processed by the processing circuit and displayed to the driver.

While electronic compass circuits are known that continuously recalibrate themselves (see, for example, U.S. Pat. Nos. 4,953,305, 5,737,226, 5,761,094, and 5,878,370, such systems do not compensate for all the errors that may be introduced through the horizontal and vertical tilting of the mirror housing. To the extent these mirror circuits may correct for some of the errors that may be introduced in this manner, these circuits are specifically programmed to not respond to an immediate change in detected field strength, but rather are programmed to recalibrate only after either a predetermined time period or predetermined other conditions are sensed. In this manner, these electronic compasses may recalibrate to account for changes in the vehicle magnetic field that may be caused by aging or other post manufacture influences such as magnetic roof-mounted antennas, while ignoring many temporary changes to the magnetic field sensed by the compass sensors that are not caused by a change in vehicle direction. Such temporary, but significant, fluctuations in the magnetic field readings occur when the vehicle passes by objects having large amounts of ferrous material, such as railroad tracks, bridges, and large buildings or when the vehicle moves through a car wash. Accordingly, such circuits are programmed to ignore or otherwise have a slower response time to many temporary field variations that they may sense. Thus, these circuits, if placed in a rearview mirror housing, would not immediately respond to any variations sensed as a result of movement of the mirror housing and sensor elements. On the other hand, if these compass processing circuits do not ignore or were more responsive to any abrupt field variations, they would frequently generate inaccurate vehicle heading readings when only temporary field variations are present.

Additionally, the prior art electronic compass circuits described above, generally do not instantaneously recalibrate. Recalibration normally requires that the vehicle travel through one or more 360 degree loops or, in the case of U.S. Pat. No. 5,737,226, at least travel through a turn of some significant degree.

In U.S. Pat. No. 6,023,229, a variety of different compensation mechanisms are proposed that would allow for compensation of horizontal tilting of the rearview mirror assembly when the sensor elements are mounted in the housing. In general, compensation for horizontal tilting is accomplished by adding or subtracting a predefined error value to numerical heading otherwise computed by the processing circuit and used to determine which of the eight-point headings (N, NE, E, SE, S, SW, W, NW) to display. The reason this approach is effective is illustrated in FIGS. 2–4. Referring to FIGS. 2 and 3, for purposes of illustration, the Y axis is defined as the axis aligned with the direction of the vehicle, the X axis is defined as the axis perpendicular to the Y axis and parallel with the earth's surface, and the Z axis is defined as the axis perpendicular to the X and Y axes.

When the two magnetic field sensors of the compass are fixedly mounted to the foot portion of the mirror mounting bracket that is attached to the vehicle windshield, one of the sensors is permanently mounted to detect magnetic field components along the Y axis while the other is permanently mounted to detect magnetic field components along the X axis. The two sensors would have the same relation to the X and Y axes of the vehicle when mounted with the X axis sensor parallel to the mirror and the Y axis sensor perpendicular to the mirror surface provided that the mirror surface lies in a plane P1 that is parallel to the X axis. Thus, if no magnetic field component is sensed by the X axis sensor and a positive magnetic field component is sensed by the Y axis sensor, the compass processing circuit would determine that the vehicle is headed north. Similarly, if no magnetic field component is sensed by the X axis sensor and a negative magnetic field component is sensed by the Y axis sensor, the compass processing circuit would determine that the vehicle is headed south. Likewise, if no magnetic field component is sensed by the Y axis sensor and a positive magnetic field component is sensed by the X axis sensor, the compass processing circuit would determine that the vehicle is headed east. If no magnetic field component is sensed by the Y axis sensor and a negative magnetic field component is sensed by the X axis sensor, the compass processing circuit would determine that the vehicle is headed west. If equal positive magnetic field components are sensed by both the X and Y axis sensors, the compass processing circuit would determine and that the vehicle is headed northeast. If equal negative magnetic field components are sensed by both the X and Y axis sensors, the compass processing circuit would determine and that the vehicle is headed southwest. If a positive magnetic field component is sensed by the Y axis sensor that is equal to the absolute value of a negative magnetic field component sensed by the X axis sensor, the compass processing circuit would determine that the vehicle is headed northwest. If the absolute value of a negative magnetic field component that is sensed by the Y axis sensor is equal to the value of a positive magnetic field component sensed by the X axis sensor, the compass processing circuit would determine that the vehicle is headed southeast. Because the magnitude of the earth's magnetic field as sensed in a horizontal plane generally does not change for a given location on the earth, the component values of the earth's magnetic field ($B_E$) as sensed in the X and Y axes ($B_X$ and $B_Y$, respectively) may be determined using Pythagoreans's Theorem, $B_E^2 = B_X^2 + B_Y^2$ (where the magnetic fields are generally measured in milliGuass (mG)). Thus, if the output levels of the magnetic sensors were plotted relative to the X and Y axes as the vehicle turned through a 360 degree loop, the levels relative to one another would form a circle as depicted as circle A in FIG. 4.

Because such electronic compasses generally only display eight different headings (N, NE, E, SE, S, SW, W, and NW) and because the magnetic field components sensed by the X and Y axis sensors are not always zero and are not always equal, the compass processing circuit generally computes a heading angle θ relative to the X and Y axes, and compares this heading angle to thresholds that define the boundaries between each of the eight different heading displays. Thus, the circular plot A shown in FIG. 4 is effectively split into eight angular segments of 45 degrees corresponding to the eight different display headings. The compass processing circuit simply determines in which segment heading angle θ lies to determine which of the eight headings to display.

When the rearview mirror is horizontally tilted such that the plane of the mirror lies in plane P (Pig. 2), the X and Y axes of the vehicle no longer correspond to the axes of the sensors. Instead, the X' and Y' axes of the sensors are rotated about the origin of the X and Y axes of the vehicle by the angle φ. The effect of such a rotation is that the compass processing circuit would compute vehicle heading angles that are incorrect by an amount equal to angle φ. Ideally, the exact angle φ that the mirror is tilted could be determined and be compass processing circuit could simply add or subtract angle φ to or from the sensed vehicle heading angle θ. U.S. Pat. No. 6,023,299 discloses that the relative angle φ that the mirror is tilted could be sensed using microswitches or a signal could be obtained from a motorized mechanism for rotating the mirror if such a mechanism is present. Alternatively, U.S. Pat. No. 6,023,229 discloses that a predetermined mirror horizontal tilt angle φ could be programmed into the compass processing circuit regardless of the actual horizontal tilt angle due to most American original equipment manufacturers' error tolerances for electronic compasses and due to the fact that the compass only display is one of eight possible vehicle headings rather than the exact heading in degrees. For example, it has been determined that in a sample of different sized drivers and different sized vehicles, the typical actual horizontal tilt angle φ is between 15 and 21 degrees. Most American original equipment manufacturers will accept a typical error of ±10 degrees for generating the final display readout. By setting the predetermined horizontal tilt angle φ to 18 degrees, this predetermined angle will only differ from the actual horizontal tilt angle by ±3 degrees. When coupled with other errors inherent in such electronic compass systems, the ±3 degree error resulting from horizontal tilting does not produce errors outside of the manufacturers' ±10 degree error tolerance.

While the techniques described above are effective for compensating for horizontal tilting, they do not compensate for vertical tilting of the housing. Vertical tilting of the rearview mirror housing is very significant in view of the fact that in some geographic areas, the earth's magnetic field strength component in the vertical (or "Z direction") is much stronger than its horizontal component that points towards the earth's magnetic north pole. Accordingly, when the X and Y axis magnetic sensors of an electronic compass are tilted vertically, a vertical component of the earth's magnetic field is sensed in the X and Y sensors thereby causing a significant shift in the magnetic field strength sensed by the compass sensing circuit. FIG. 5 shows the effect of tilting the mirror vertically. Specifically, circle B represents the plot of sensor output levels prior to tilting, and circle C represents the plot of sensor output levels following vertical tilting. As evident from FIG. 5, vertical tilting of the mirror and sensors causes the entire circular plot to shift along the Y axis by an amount equal to the portion of the Z component of the earth's magnetic field that is sensed by the Y axis sensor. Such shifting introduces significant errors when the vehicle is headed east or west. As apparent from the above discussion pertaining to horizontal tilting, the added error introduced by vertical tilting may exceed the manufacturers' error tolerances.

U.S. Pat. No. 6,023,229 does disclose at least one possible method for compensating for vertical tilting of the mirror and compass sensors. Specifically, it discloses first detecting whether a vertical tilt has occurred by providing an additional magnetic field sensor oriented in the Z axis, and by monitoring both the resultant of the X, Y, Z vector and the X,Y magnitude. If the resultant of the X, Y, Z vector does not change but the X,Y magnitude suddenly changes, it is deemed likely that the mirror has been vertically tilted. When such a vertical tilt is detected, the processing circuit may perform the quick recalibration routine disclosed in U.S. Pat. No. 5,737,226, which essentially repositions the origin of the reference X and Y axes to correspond to the center of the circular plot of data obtained from the sensors as the vehicle travels in 360 degree loops.

While the methods for compensating for horizontal and vertical tilt of the rearview mirror and sensors described in U.S. Pat. No. 09/260,267 are effective, the need to use an additional magnetic field sensor for sensing Z axis field components to correct for vertical tilting, not only adds to the cost, but also adds to the bulk of the components that are mounted in the rearview mirror housing. Additionally, the reliance on the compass processing circuit to recalibrate the compass after vertical tilting has been detected may introduce temporary erroneous readouts at least until the vehicle travels through a sufficient turn to enable recalibration.

Therefore, there exists a need for a mechanism for quickly and accurately compensating the electronic compass for any vertical tilting of the rearview mirror assembly housing. There also exists a need for a mechanism for compensating the electronic compass for any vertical tilting of the rearview mirror assembly housing without adding significantly to the cost of the mirror assembly.

SUMMARY OF THE INVENTION

Accordingly, it is an aspect of the present invention to provide a solution to the above problem that enables the sensing circuit of an electronic compass to be mounted in the rearview mirror housing so as to not be adversely affected when the rearview mirror housing is vertically tilted. To achieve these and other aspects of the present invention, the rearview mirror assembly of the present invention comprises a housing; a mounting structure for pivotally mounting the mirror housing to the vehicle such that the housing may be both vertically and horizontally tilted; a mirror mounted in the housing; a compass sensor disposed in the housing and coupled to a compass processing circuit; and a tilt detector for detecting when the housing has been tilted from a prior position and for generating and transmitting a tilt detection signal to the compass processing circuit.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3 is a top exploded view of a rearview mirror assembly shown in a tilted position;

FIG. 4 is a graph illustrating a plot of compass sensor data when the compass is properly calibrated;

FIG. 5 is a graph of plots of compass sensor data illustrating the effect of vertical and horizontal tilting of a rearview mirror assembly when the compass sensors are mounted in the mirror housing;

FIG. 6 is an exploded perspective view of the rearview mirror assembly constructed in accordance with the present invention;

DETAILED DESCRIPTION OF THE PREFERRED EMBODIMENTS

Figure 1:
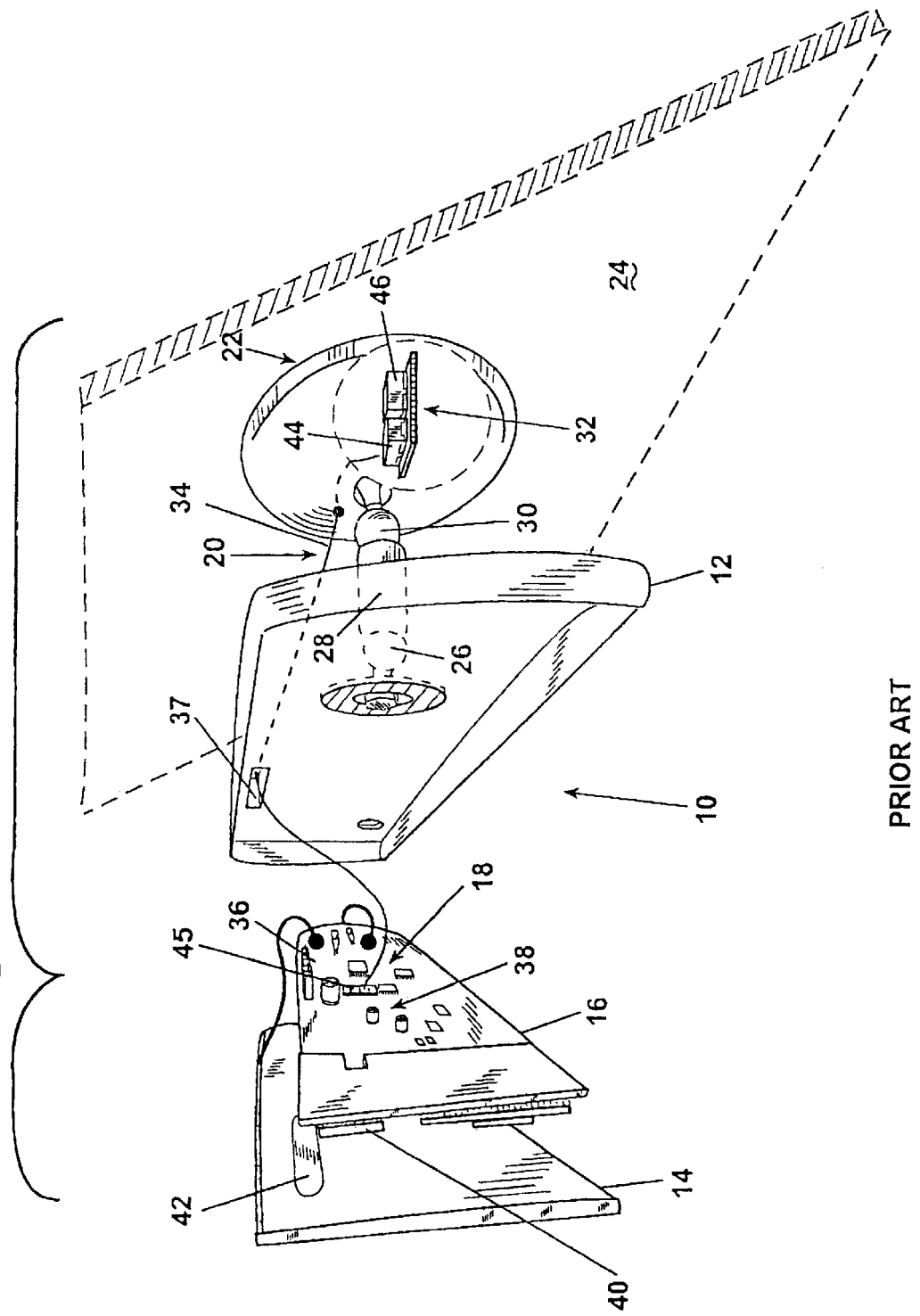
FIG. 1 is an exploded perspective view of a prior art rearview mirror assembly including a compass system.
Figure 2:
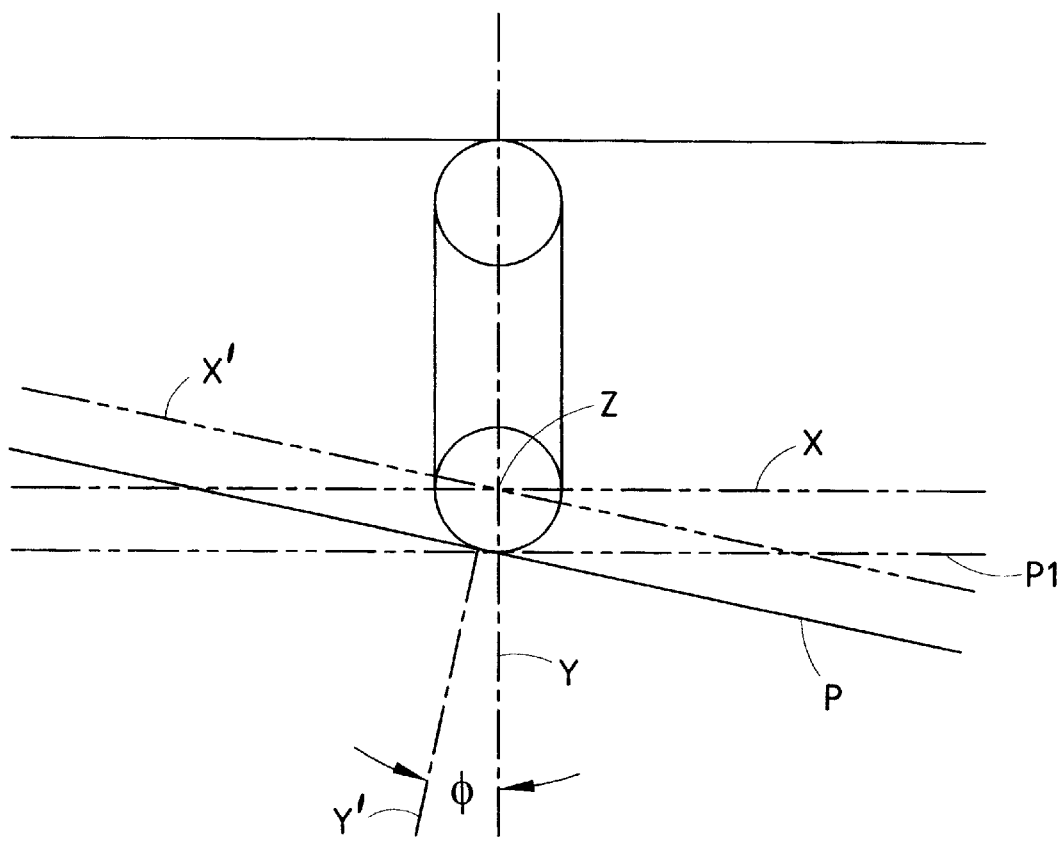
FIG. 2 is a plan view schematic diagram showing the typical rotation range of a mirror housing in the X, Y plane.

As discussed in detail below and shown in FIG. 6, a rearview mirror assembly 100 constructed in accordance with the present invention includes a mirror housing 120, a mounting structure 445 for pivotally mounting mirror housing 120 to the vehicle such that mirror housing 120 may be both vertically and horizontally tilted relative to the vehicle. In FIG. 6, reference numeral 240 represents a windshield of the vehicle to which mounting structure 445 may be secured. It will be understood by those skilled in the art that mounting structure 445 may alternatively be secured to the roof structure of the vehicle above the windshield. In some applications, a single ball mount is preferable so that measurements of the rotational position on the single ball accurately indicate the position of the mirror in the vehicle.

Rearview mirror assembly 100 further includes a mirror 140 mounted in mirror housing 120, and a compass sensor 320 disposed in mirror housing 120 and coupled to a compass processing circuit 380. Compass sensor 320 generally includes an X-axis magnetic field sensor 440 and a Y-axis magnetic field sensor 460. Sensors 440 and 460, as well as compass processing circuit 380, are preferably mounted on a printed circuit board 160.

Rearview mirror assembly 100 also preferably includes a display 400 mounted within mirror housing 120 for displaying the current heading of the vehicle. Preferably, display 400 is mounted on a front surface of printed circuit board 160 so as to project light through a window portion 420 provided in the reflective surface of mirror 140. As described further below with reference to FIG. 7A, display 400 is coupled to compass processing circuit 380 to receive the sensed vehicle heading.

Mirror 140 is preferably an electrochromic mirror having an electrochromic element 71 (FIG. 7A) located in front of a reflective layer. The sensors and circuitry for automatically varying the transmittance and hence reflectivity of electrochromic mirror 140 is also preferably mounted on printed circuit board 160. Such circuitry may be coupled to mirror 140 via wires 142 in any conventional manner.

Electrochromic mirror 140 preferably has a structure corresponding to one of the embodiments disclosed in U.S. patent application Ser. No. 09/311,955, entitled ELECTROCHROMIC REARVIEW MIRROR INCORPORATING A THIRD SURFACE METAL REFLECTOR AND A DISPLAY/SIGNAL LIGHT and filed on May 14, 1999, the disclosure of which is incorporated herein by reference.

As described further below with reference to FIGS. 8–26, rearview mirror assembly 100 further includes a tilt detector 500 for detecting when mirror housing 120 has been tilted from a prior position. Tilt detector 500 then generates and transmits a tilt detection signal to compass processing circuit 380 such that compass processing circuit 380 may take into account the fact that the mirror housing 120 and hence sensor 320 has been tilted when computing and generating the vehicle heading display signals.

Figure 7A:
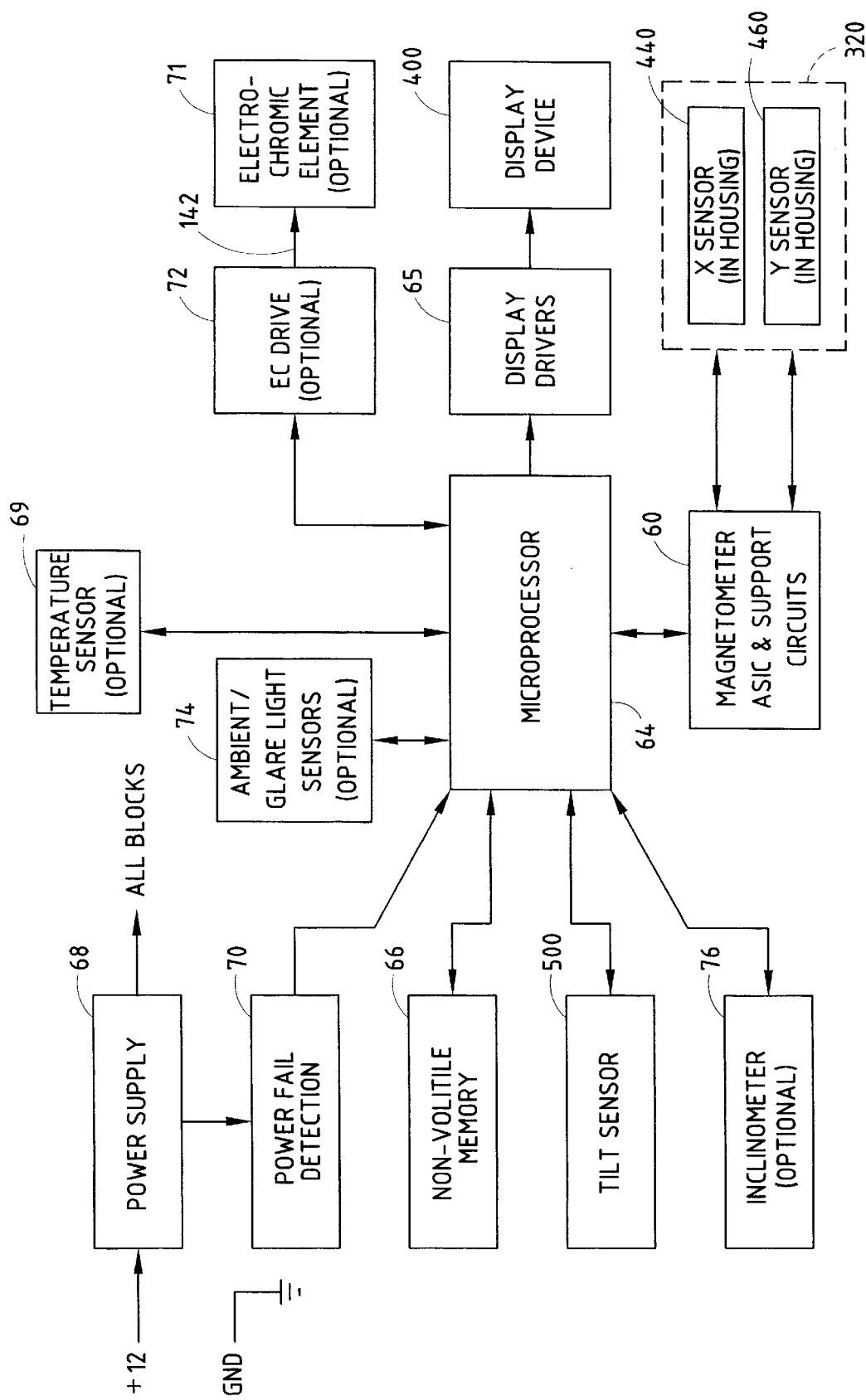
FIG. 7A is an electrical circuit diagram in block form illustrating the electrical circuitry of the inventive rearview mirror assembly.

Referring now to FIG. 7A, the electrical circuitry of the present invention includes a microprocessor 64, a display device 400 coupled to microprocessor 64 via display driver circuitry 65, compass sensor 320 including an X-axis sensor 440 and a Y-axis sensor 460 that are coupled to microprocessor 64 via a magnetometer application-specific integrated circuit (ASIC) and support circuits 60, tilt sensor 500 coupled to microprocessor 64, a non-volatile memory 66 that is also coupled to microprocessor 64, a power supply 68 that is coupled to either the vehicle battery or vehicle ignition for supplying power to all the components shown in FIG. 7A, and a power fail detection circuit 70 that is coupled to power supply 68 in microprocessor 64. The details of power fail detection circuit 70 are described below with reference to FIG. 7B. Of these components, microprocessor 64, circuit 60, and non-volatile memory 66 constitute compass processing circuit 380 referenced and shown in FIG. 6. The functions of these components and details of various embodiments of tilt sensor 500 are discussed further below.

As shown in FIG. 7A, the circuitry in rearview mirror assembly 100 may optionally include an electrochromic drive circuit 72 coupled between microprocessor 64 and electrochromic element 71 of mirror 140. Components 71 and 72 would not be included if mirror 140 were not electrochromic. Microprocessor 64 may also optionally be coupled to a temperature sensor 69 that is generally remotely located from rearview mirror assembly 100 so as to detect external air temperature and supply this information to microprocessor 64 for display on display device 400. If mirror 140 is electrochromic, rearview mirror assembly 100 also preferably includes ambient/glare light sensors 74 for sensing ambient light levels outside the vehicle in a forward direction and for sensing glare light levels that impinge upon mirror 140. Sensor(s) 74 would be coupled to microprocessor 64 such that microprocessor 64 may respond to the detected light levels and adjust the reflectivity of electrochromic element 71.

Rearview mirror assembly 100 may further incorporate an inclinometer 76 that is coupled to microprocessor 64. Alternatively, inclinometer 76 may be remotely located from microprocessor 64 (such as in the foot portion of the mirror mounting bracket) and its output may be supplied by a dedicated line or via the vehicle bus system (not shown). The function of the inclinometer is discussed further below.

Many different components are illustrated in FIG. 7A, it will be appreciated by those skilled in the art that various additional components may be included or otherwise coupled to microprocessor 64. For example, microprocessor 64 may be coupled to the vehicle bus so as to receive a multitude of different types of information that may subsequently be used to control the components within the rearview mirror. For example, microprocessor 64 may receive vehicle mileage data, vehicle speed, and remaining fuel levels so as to compute and display various information to the vehicle occupants and hence function as a vehicle trip computer. Also, mirror assembly 100 may include map lamps that are controlled under direction of microprocessor 64, and hence, a door open signal or interior lights on signal may be received by microprocessor 64 over the vehicle bus and used to illuminate the map lamps in mirror assembly 100. Additionally, microprocessor 64 is preferably coupled to any external electrochromic mirrors so as to vary their reflectivity simultaneously with interior mirror 140. While the present invention is shown in FIG. 6 and described below with reference to an interior rearview mirror assembly, it will be appreciated by those skilled in the art that mirror assembly 100 could also be an exterior rearview mirror assembly.

As mentioned above, a tilt detector 500 is provided that senses when mirror housing 120, and hence sensors 440 and 460, have been moved. Because such movement causes the readings of sensors 440 and 460 to become less accurate, compass processing circuit 380 responds to a detection of such movement by compensating the sensor readings or display signal and/or compensating the calibration point as a means for recalibrating the compass. More specifically, compass processing circuit may immediately shift the calibration point (i.e., the origin of the reference X- and Y-axes and the axes themselves) by an amount equal to any change in the directional components sensed by sensors 440 and 460 that is detected immediately after the tilt detection signal is received. In this manner, compass processing circuit 380 may immediately determine the amount of error that is introduced as a result of the direct movement of the mirror housing and sensors, and immediately compensate and recalibrate the compass based upon this detected error. Thus, compass processing circuit 380 need not enter a recalibration mode whereby the vehicle must first turn through one or more closed loops or portions of closed loops to determine the new calibration point.

In the event the vehicle ignition is turned off at such time that the rearview mirror assembly 100 is moved, such movement may nevertheless be detected using the various tilt detection mechanisms described below, and the sensor readings obtained just prior to the vehicle ignition being turned off may be stored in non-volatile memory 66 and subsequently compared to the readings immediately after ignition is turned back on, so as to allow compass processing circuitry 80 to immediately compensate and recalibrate even when the vehicle ignition was turned off.

Figure 7B:
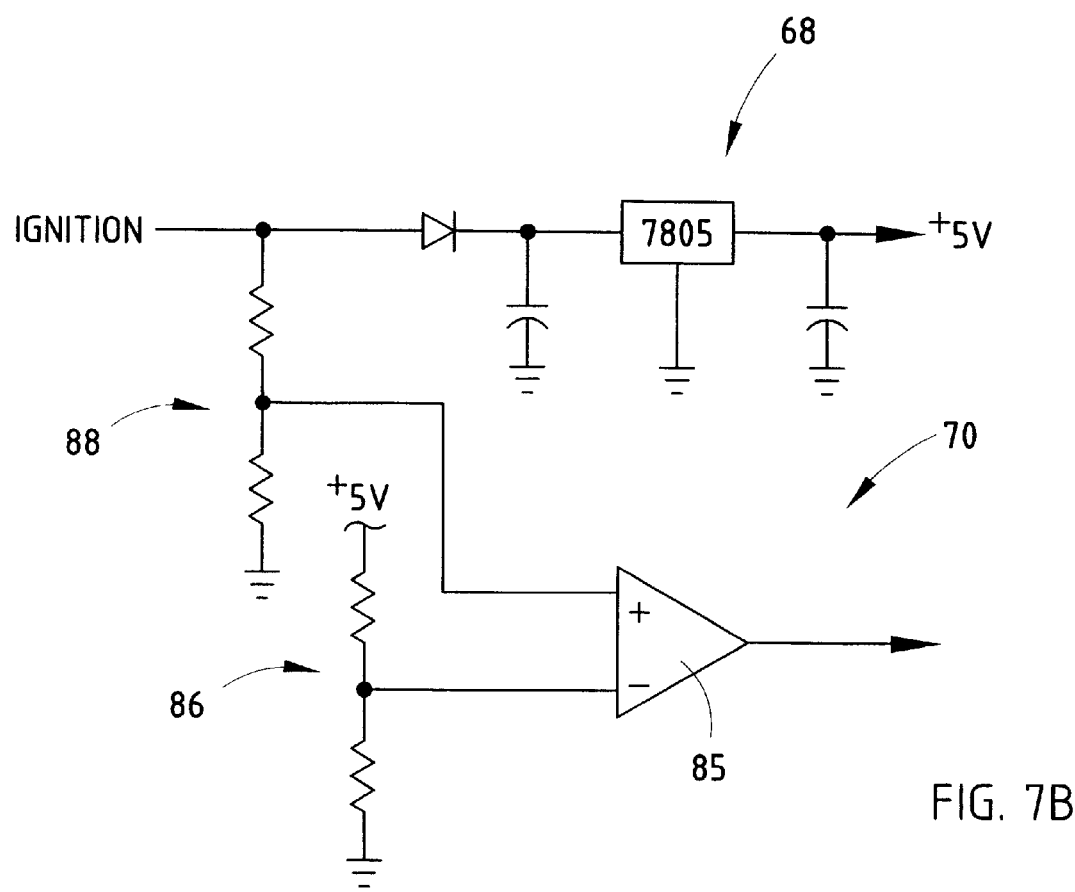
FIG. 7B is an electrical circuit diagram in schematic form illustrating the power fail detection circuit shown in FIG. 7A.

FIG. 7B shows a preferred construction for power supply 68 and power fail detection circuit 70. Power supply circuit 68 may be any conventional power supply circuit for converting the voltage from the vehicle ignition to a 5-volt level. If the vehicle ignition exceeds 12 volts, power supply 68 is preferably constructed in the manner disclosed in commonly assigned U.S. patent application Ser. No. 09/426,794, filed on Oct. 22, 1999, the disclosure of which is incorporated herein by reference. As shown in FIG. 7B, power fail detection circuit 70 includes a comparator 85, which compares the voltage obtained from a tap in a voltage divider 88 that is coupled to the ignition power line to a reference voltage obtained from another voltage divider 86 that is coupled to a 5-volt power supply. Thus, as shown, this reference is 2 volts. When the ignition voltage level is at 8 volts, the voltage obtained from voltage divider 88 is preferably equal to the reference voltage. Thus, so long as the voltage of the ignition is greater than 8 volts, in this particular example, comparator 85 will output a power good signal that is supplied to microprocessor 64 for its use in determining whether or not the ignition power is on or off.

Having generally described the concepts of the present invention, the various embodiments of the tilt detector are described below. The first embodiment is shown in FIGS. 8–12.

Figure 8:
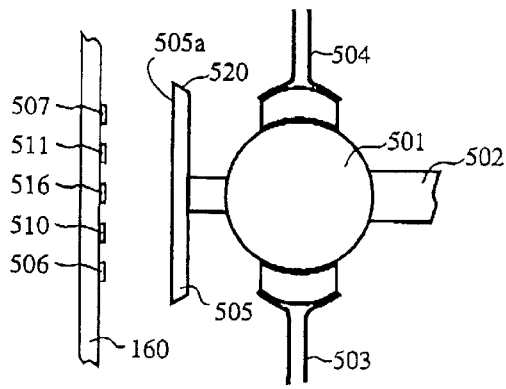
FIG. 8 is a top perspective view of a tilt detector constructed in accordance with a first embodiment of the present invention when the mirror is positioned in a first non-tilted position.

In FIG. 8, a portion of a pivot for a single ball mirror mount, a portion of a circuit board, and the components used to measure the position of the mirror on the mount are shown. Ball 501 is attached to the automobile by stem 502 via a mounting bracket which is not shown. The assembly is viewed from the top. Ball socket 503 is forced against ball 501 by spring bracket 504. Spring bracket 504 is rigidly attached to the mirror case, not shown, as is circuit board 160, a portion of which is shown. A target 505 is attached to the pivot ball and has a diffuse, preferably Lambertian, reflecting surface 505a. Two of four LEDs, 506 and 507, are shown in FIG. 8. These LEDs are momentarily lighted one at a time, and the light individually reflected off of surface 505a by each of the LEDs is measured by a photodiode 516. The LEDs and the photodiode are preferably surface mount components. Furthermore, since uniformity of light level is important, the LEDs preferably incorporate a diffusant. Component 510 is placed between LED 506 and photodiode 516 to block light from traveling directly from LED 506 to photodiode 516. The periphery 520 of target 505 should be beveled so that light from this surface is not reflected to the photodiode.

Figure 9:
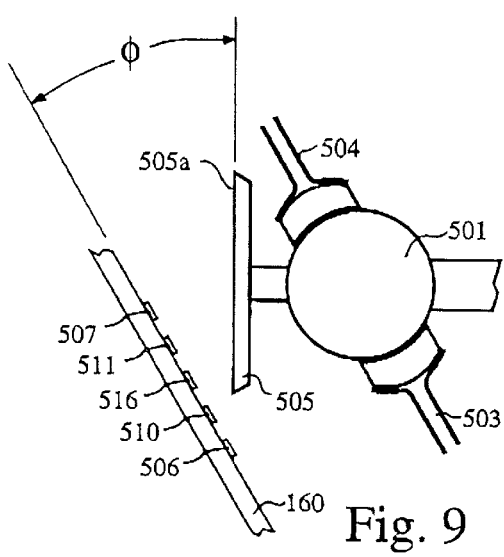
FIG. 9 is a top perspective view of a tilt detector constructed in accordance with a first embodiment of the present invention when the mirror is positioned in a first tilted position.
Figure 11:
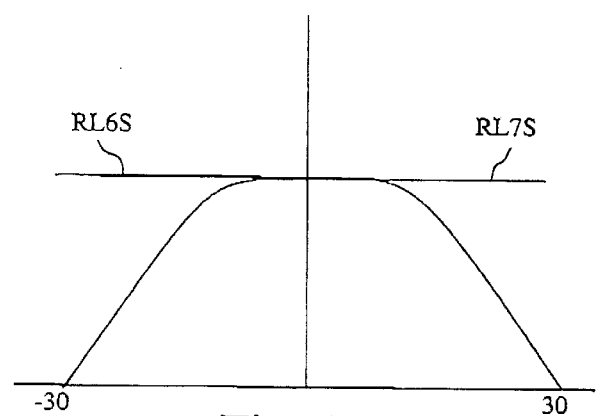
FIG. 11 shows the ideal readouts of the tilt detector through a range of tilt obtained after normalized readings.

FIG. 9 depicts the mirror rotated to one of its extreme positions on the mirror ball 501. In the example, the angle φ is about 30 degrees. The geometry of the configuration is such that LED 506 is approximately in line with surface 505a of target 505. In this position, little or not light from LED 506 reaches a surface 505a. As the mirror is rotated reducing the angle φ, the light from LED 506 impinging on surface 505a and diffusely reflected to photodiode sensor 516 increases smoothly until angle φ decreases to about 5 degrees. As the angle φ decreases from approximately 5 degrees to −30 degrees, the light level reflected from LED 506 to photodiode 516 by surface 505a remains approximately constant. The independently measured light level from LED 507 is approximately the mirror image of the light level reflected from LED 506. In use, the mirror is always angled to one side or the other based upon either a right- or left-sided driving position, so the fact that the light levels from both LED 506 and LED 507 have reached a maximum between −5 degrees and 5 degrees is not detrimental to the function. Also, inside rearview mirrors are typically mounted at eye level for an average-sized driver and therefore the mirror is typically vertically tilted downward.

Figure 10:
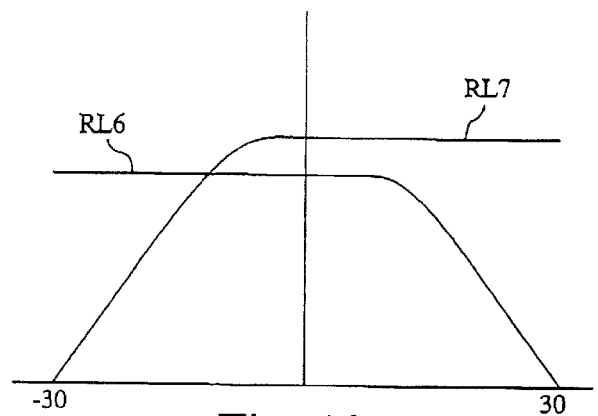
FIG. 10 is a graph illustrating the sensor levels detected through a range of tilt.

In FIG. 10, the output level for LED 506 as a function of angle φ, shown in FIG. 9, is depicted by RL6 and the output level for LED 507 is depicted by RL7. Note that the peak light levels detected for LED 506 and LED 507 are not the same. This is primarily because the light output varies from one LED to another. In a preferred embodiment, the light output of each of the LEDs is measured during production testing and calibration. These relative levels are stored in memory. These readings taken at calibration are used by the microcontroller to scale the individual LED readings so that the ranges match as depicted by RL6S and RL7S in FIG. 11. Since the light energy flux impinging on surface 505a is proportional to the sine of the elevational angle relative to the surface at which the light rays strike surface 505a, the light level from LED 506 or LED 507 read by the photodiode is a strong function of the angle φ and a weak function of the tilt angle. This is convenient, since the directional angle of the mirror relative to the mount in the horizontal plane and the tilt angle of the mirror in the vertical plane need to be measured with some degree of independence. Another beneficial feature of the arrangement is that as the tilt angle is increased, plots resembling those in FIGS. 10 and 11 taken at constant, but large, tilt angles have active ranges for which angle φ goes through 0 degrees. Thus, the active ranges overlap and there is no "dead" spot in the middle. This also applies to the curves for the tilt angle in the vertical plane taken with a relatively large directional angle in the horizontal plane. This is the required characteristic, since in use, the tilt angle may be very small but the directional angle is never very small for a normal application of the mirror.

Figure 12:
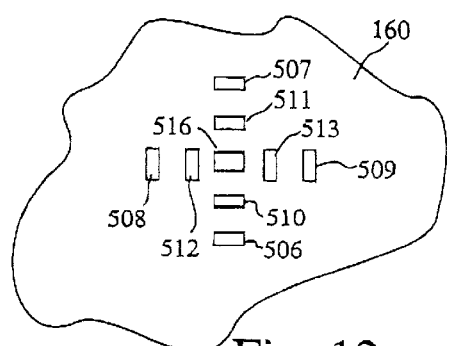
FIG. 12 is a front view of a portion of the tilt detector constructed in accordance with a first embodiment of the present invention.

FIG. 12 depicts photodiode 516, four LEDs 506 through 509, and four components to block light 510 through 513. Rotation about a vertical axis has been depicted in FIGS. 8 and 9. LEDs 508 and 509 are used in a very similar way to measure the tilt angle about a horizontal axis.

The configuration, although not complex at first glance, has marked benefits over many alternate arrangements. First, the target 505a is large and relatively close to the sensor and LED light sources so even with a diffuse light source, the light level reflected to the sensor is relatively high. Diffuse light sources are desirable and perhaps the only practical ones for low cost surface mount components which fit in the available space. Focused and highly characterized illumination patterns are not required and would generally add greatly to the cost and production tolerance problems if incorporated. Secondly, the nearly ideal response patterns are achieved primarily by the fact that the illumination level due to incident rays impinging on the surface 505a is proportional to the sine of the elevational angle of the incident rays relative to the point at which they strike the target. Stated another way, the surface illumination increases as the surface is rotated so that more of the light from the source strikes the surface. This eliminates the need for special gray scale gradations in the reflectance of surface 505a. Note that the inclusion of shading or other characterization of the surface 505a may be used for additional shaping of the response characteristic and are not outside the scope of this invention. Note also that the positioning of the LEDs so that the illumination level of surface 505a decreases to approximately zero at the extremes of the usable travel is an important feature of the design. Another advantage of the design is that in the primary path from each of the LEDs to the sensor, the light undergoes only one reflection so the design is not excessively sensitive to modestly reduced reflectivity of surface 5a due to material selection, production tolerance, or darkening with age.

By comparison, an alternate design incorporated a white target having less than one-fifth the area of the target in the preferred embodiment. In the alternate design, the target was positioned much closer to the mirror ball, and correspondingly farther from the photodiode sensor and LED light sources. The sensed light level for similar LEDs was lower by approximately a factor of five. Furthermore, the background area surrounding the target and visible to the sensor was so large that even with strong attention to blackening of surfaces in this area, the background light level was objectionably high.

A sensor described in commonly assigned U.S. patent application Ser. No. 09/307,191, entitled PHOTODIODE LIGHT SENSOR, filed May 7, 1999, which is incorporated herein by reference, is a preferred light sensor which may replace the photodiode in the previous configuration. The sensor should be packaged in a surface mount package. The sensor reading as described in U.S. patent application Ser. No. 09/307,191 consists of two phases. During the first phase, the light level is sampled for a controlled period of time. During the second phase, a pulse output duration proportional to the product of the incident light level and the sample time is output by the sensor. The microcontroller in the design can initiate and control the sample integration period and read the sensor's output pulse width, which is indicative of the light level all through one bidirectional input/output port. The calibration constants stored to compensate for brightness of each of the LEDs can simply be integration pulse width settings where each integration pulse width setting is inversely proportional to the light level of the corresponding LED.

Target 505a preferably has a relatively uniform, nearly flat, diffuse reflecting area. The preferably diffuse light source is positioned so that it is approximately in the plane of the surface of the target when the mirror is near an extreme of travel on the pivot ball. Thereby, the target intercepts little or no light from the source in this configuration. As the LED light source rotates farther away from the plane of the target, a gradually increasing amount of light from the LED is intercepted by the target. The diffuse target surface reflects this light in many directions and the sensor is placed to directly sample the level of this diffuse reflected light. Thus, the sensed light output increases gradually and predictably as the LED light source is rotated to a position which is farther from the plane of and on the visible side of the target. Multiple LEDs are used one at a time to measure rotation of the mirror on the pivot in different directions or about different axes.

Second, with the position sensing just described, a lookup table and/or calculation may be used to determine with reasonable accuracy the actual position of the mirror on the ball as a function of the four light level readings. The light level readings or optionally the position calculated from them is placed in memory and the current position of the mirror on the ball is determined repeatedly by reading the ball position sensor light levels and converting them to a form suitable for comparison. The change in the light levels or optionally the calculated position of the mirror on the ball is used to determine when the mirror has been readjusted. Just after readjustment has occurred, as indicated by stabilized successive position readings, the difference of this new position of the mirror on the pivot ball and the original position may also be calculated to indicate the angular adjustment increment of the mirror on the pivot ball. When this adjustment increment is large enough (for example, 3 degrees) to warrant a correction in the compass reading, the change in the magnetic vector readings recorded just after the mirror was rotated on its pivot relative to corresponding readings taken just before the adjustments are compared to determine a new correction to apply in calculation of the indicated direction as a function of the compass magnetic vector reading. The magnetic vector reading should change smoothly with rotation of the mirror on the ball mount and there should be a reasonable correlation between the measured incremental change in the position of the mirror on the ball and the incremental change in the measured magnetic field. This correlation should be checked and if it is not reasonable, it is preferred to make no immediate correction but to defer to the automatic calibration to correct for the change after several turns of the vehicle. If this expedient is not followed, the immediate correction may, due to unusual circumstances, increase rather than reduce the error in the indicated direction reading.

Many comparison algorithms are possible for determining if the change in magnetic vector and/or indicated direction readings correlates reasonably with the change of the position of the mirror on the ball. A simple one is, for example, to use the conversion from magnetic field reading to direction reading which was in effect just before the mirror adjustment and to apply it to the magnetic field readings taken just before and just after the mirror position adjustment. The angular difference in these two calculated direction readings may then be compared to the angular change of the mirror position on the ball due to the adjustment. Then the criteria may be, for example, to bypass the immediate modification of the conversion from magnetic vector to direction reading if the angular difference in the calculated direction readings exceeds the angular increment of the mirror adjustment by a ratio of more than 2.5 to 1.

Figure 13:
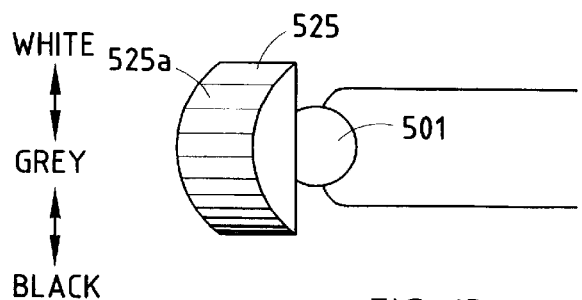
FIG. 13 is a perspective view of a tilt detector constructed in accordance with a second embodiment of the present invention.

Third, the compass reading once corrected indicates the direction relative to the direction of the mirror in the horizontal plane rather than relative to the front of the vehicle. Since the actual direction of the mirror on the ball in the horizontal plane is measured, the compass direction reading may be offset to correct for the actual angle of the mirror relative to the vehicle in the horizontal plane. When this optional correction is made, it must be taken into account in the determination of the modification of the algorithm to calculate the direction from the magnetic field vector so that correction for a change in the horizontal direction of the mirror is not applied twice in the overall correction. Referring to FIG. 13, a second embodiment of the target detector is shown. In the second embodiment, target 525 is configured to have a cylindrical surface 525a on an opposite side of target 525 from then mirror ball 501.

Such a cylindrical surface would be used when tilt detector 500 is designed to detect tilt in the vertical or horizontal direction. As shown in FIG. 13, the cylindrical surface is configured for vertical tilt detection. When such a target is used, only one or both of LEDs 506 and 507 (FIG. 12) need be used. In the configuration shown in FIG. 13, cylindrical surface 525a preferably has a coding or the like of varying reflectance that is highly reflective at one edge and not very reflective at the other end with a gradual reduction of reflectivity between the top and bottom edges. This may be accomplished by a white to gray to black scale that may be applied to surface 525a.

Thus, if the mirror is rotated beyond what is considered a normal driving position, the reflectance would change allowing detection of that movement. If a drastic movement is sensed, as may be the case when a vehicle occupant is checking their makeup or moving the mirror to view the backseat area of the vehicle, a significant drop in reflection would be detected and compass processing circuit 380 could lock the displayed heading until such time that the mirror is returned to a reasonable position.

Figure 14A:
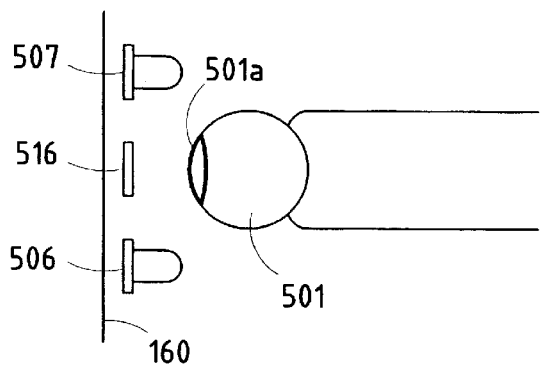
FIGS. 14A and 14B are side views of a tilt detecting mechanism constructed in accordance with a third embodiment of the present invention.
Figure 15:
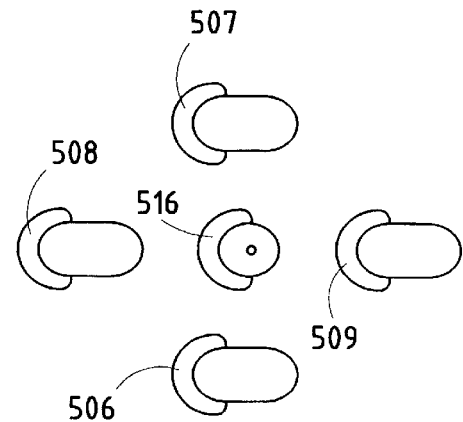
FIG. 15 is a perspective view of a portion of the tilt detecting mechanism constructed in accordance with the third embodiment of the present invention.
Figure 14B:
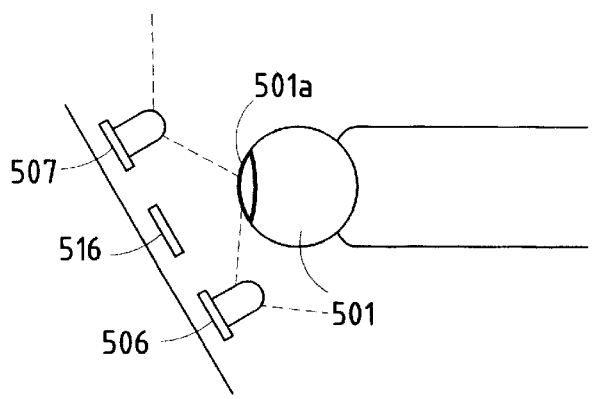

A third embodiment of the present invention is shown in FIGS. 14A and 14B. This embodiment is similar to the first two embodiments in that light from LEDs (or other light sources) is reflected off of a target and then sensed by a sensor. This embodiment differs, however, in that a target surface 501a is provided directly on the surface of mirror ball mount 501. Like the first two embodiments, the third embodiment includes LEDs 506 and 507 respectfully disposed below and above a sensor 516. As shown in FIG. 15, the tilt detector of the third embodiment may further include LEDs 508 and 509 laterally disposed on either side of sensor 516 for sensing horizontal tilting of the rearview mirror assembly. Like the first embodiment depicted in FIG. 12, light blocking components 510–512 may be provided to prevent any light from reaching photo sensor 516 that is emitted directly from one of the LEDs without first reflecting off of the target.

Target 501a may be a white spot provided on a black or dark ball 501. Conversely, the target could be a black spot on a white or highly reflective ball 501. Basically, the target can be any color that contrasts with the mirror ball, where "color" is defined as the reflectance at the light spectrum being used. In general, it is the contrast difference between the target region 501a and the surrounding area that is being measured. The target can be painted on ball 501, a separate plastic member (as in the first two embodiments), an adhesive sticker, or even a variation in surface texture of ball 501. Additionally, a void can be molded into ball 501 that appears as a black target on a light background. Further, ball 501 may be made of metal and have a portion mirrored to serve as target 501a.

While LEDs are described above and below for implementation in the target detector, alternate light sources can be used, such as incandescent, fluorescent, etc. Nevertheless, LEDs are preferred for their low cost, ease and mounting to the circuit board, and their relatively small size.

LEDs 506–509 may be selected that emit generally only infrared (IR) light, and photodetector 516 may thus be one that detects primarily only the light in the wavelength range emitted from the IR LEDs. By using IR LEDs for the tilt detector, stray light from the LEDs will not adversely affect the ambient and glare light sensors when the invention is implemented in an electrochromic mirror. Otherwise, unless some light baffling structure or other measure is taken, any visible light that is emitted from the LEDs of the target sensor may produce stray light that is detected by the ambient or glare light sensors thereby causing the sensors to indicate that there is more ambient or glare light levels present than there actually may be. LEDs that emit visible light may nevertheless be desirable due to their lower cost.

Figure 16:
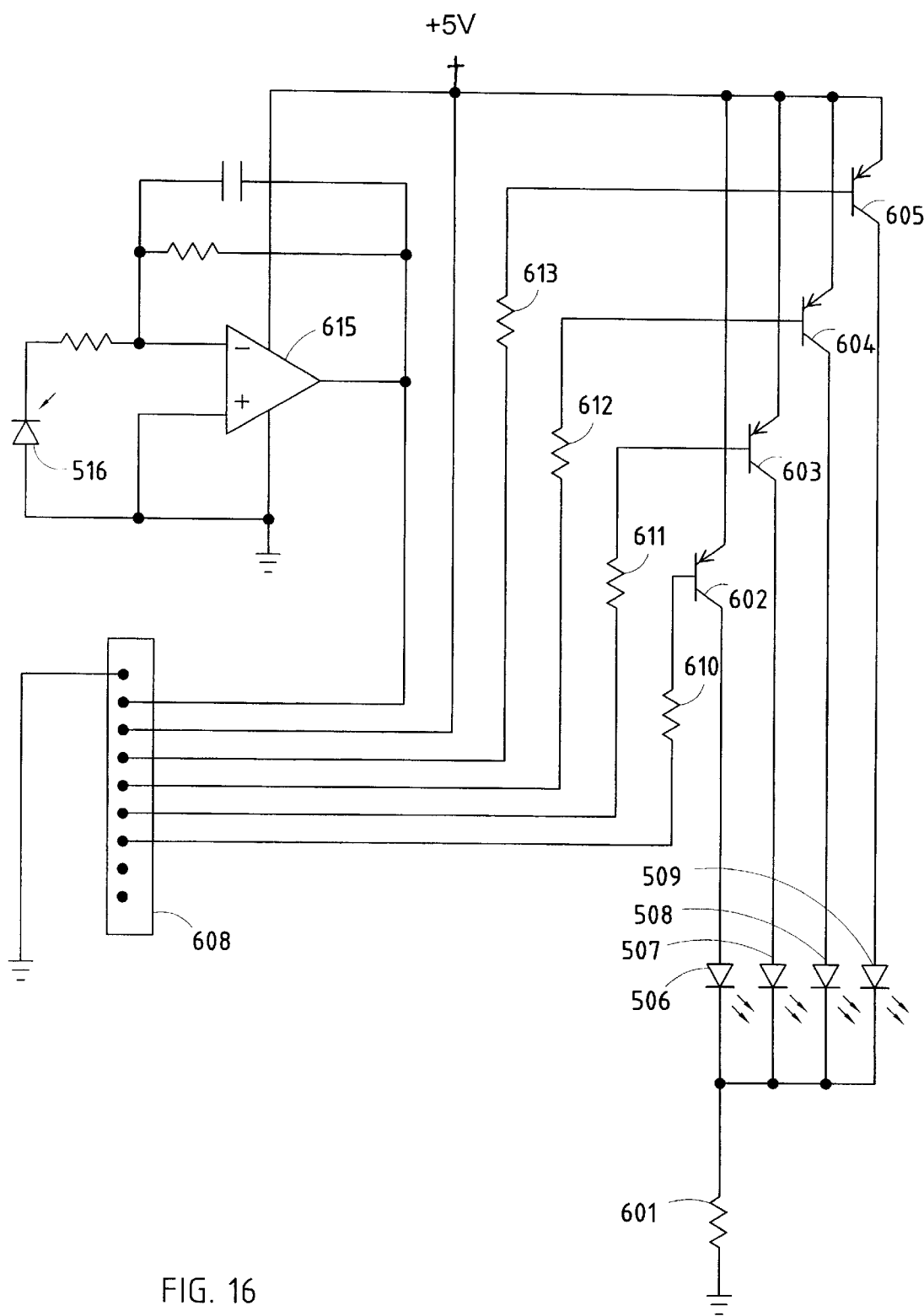
FIG. 16 is an electrical circuit diagram in schematic form illustrating the electrical components of the tilt detector constructed in accordance with the third embodiment of the present invention.

FIG. 16 illustrates an exemplary circuit used to drive LEDs 506–509 and to read the light levels sensed by light sensor 516. Light sensor 516 may be a photodiode, a CdS photocell diode, or the like. As shown in FIG. 16, LEDs 506–509 are each coupled to a common ground via a resistor 601. LEDs 506–509 are also coupled to a common power supply line via a respective transistor switch 602–605. The gates of the transistors are coupled to input pins of a circuit board coupler 608, that are in turn coupled to microprocessor 64 (FIG. 7A). Resistors 610–613 are provided in the input path between the pins of coupler 608 and transistors 602–605. Light sensor 516 is coupled between ground and the input of an integrating amplifier 615, which has its output coupled to a pin of coupler 608 that in turn couples to an input of microprocessor 64.

Figure 17:
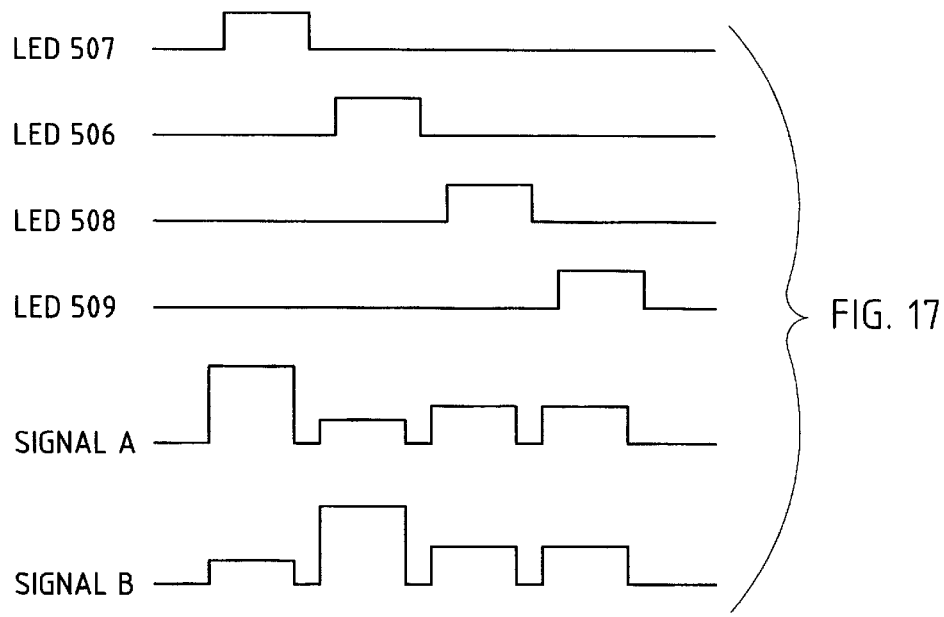
FIG. 17 is an electrical signal timing chart illustrating an example of the signals delivered to the LEDs and sensed by the sensor of the inventive tilt detector.

As shown in FIG. 17, microprocessor 64 may sequentially deliver a pulse to each of the respective transistors 602–605 that causes sequential activation of each of LEDs 506–509. Thus, only one of the LEDs is turned on at a time. As the activation pulses are delivered to switches 602–605, microprocessor 64 monitors the amplified output of light sensor 516. An example of the output generated from light sensor 516 is also shown in FIG. 17. When the mirror is tilted down, and target 501a is more reflective than the remainder of ball 501, the amount of light that sensor 516 detects is greater when LED 507 is illuminated than it is when LED 506 is illuminated. This is because more of the light from LED 507 is reflected off of target 501a towards sensor 516 than the portion of light from LED 506 that is reflected off of target 501a. Thus, the output when the mirror is tilted down is shown as signal A in FIG. 17. When the mirror is tilted up, however, the opposite is true. Thus, the levels detected by light sensor 516 would represent signal B shown in FIG. 17. Note that if the mirror is moved horizontally, the relative light levels sensed when LEDs 508 and 509 are separately illuminated would vary and hence be detected by microprocessor 64.

As described above, the compass processing circuit generally determines when the mirror has been tilted and compensates or recalibrates the compass based on the difference between the sensor readings immediately prior to the tilt and immediately after the tilt is detected. Using the approach in the embodiments above and below, the degree of tilt may be ascertained by the degree to which the detected light levels vary. Thus, the compass processing circuit could alternatively take into account the actual degree of tilt when compensating or recalibrating the compass rather than utilizing the difference between the levels sensed immediately prior and after a tilt has been detected.

Figure 18:
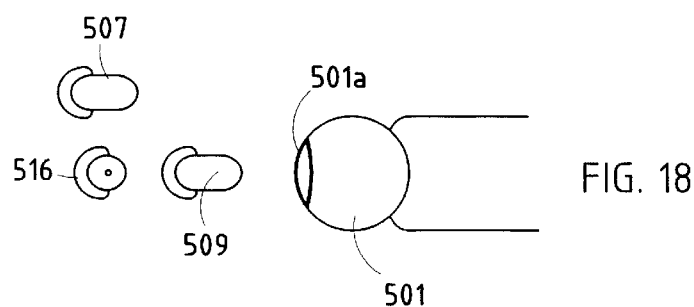
FIG. 18 is a perspective view of a tilt detector constructed in accordance with a fourth embodiment of the present invention.

FIG. 18 shows a fourth embodiment of the tilt detector of the present invention that is similar to the third embodiment, with the exception that only LEDs 507 and 509 are utilized. Clearly, by reducing the number of LEDs, the component count and cost of the mirror may be reduced. The relative movement of the mirror may still be determined merely by monitoring whether the amount of light detected by sensor 516 varies from previous measurements during which time either one of the LEDs 507 and 509 is illuminated. It should be noted, however, that the configuration shown in FIG. 15 is preferred over that shown in FIG. 18, since the embodiment shown in FIG. 15 is less subject to temperature and unit-to-unit variations. Also, if varying levels of ambient light should reach sensor 516 at any time, such light could affect the ability of the tilt detector to detect whether in fact the mirror has been tilted or not. Using the configuration shown in FIG. 15, however, if ambient light is increased, the light level sensed by sensor 516 would be increased for each instant that all of the four LEDs have been turned on, which would indicate that the mirror has not been tilted since it would otherwise produce a lower level when one of the LEDs is activated while producing a higher light level when the opposite LED is illuminated.

Figure 19:
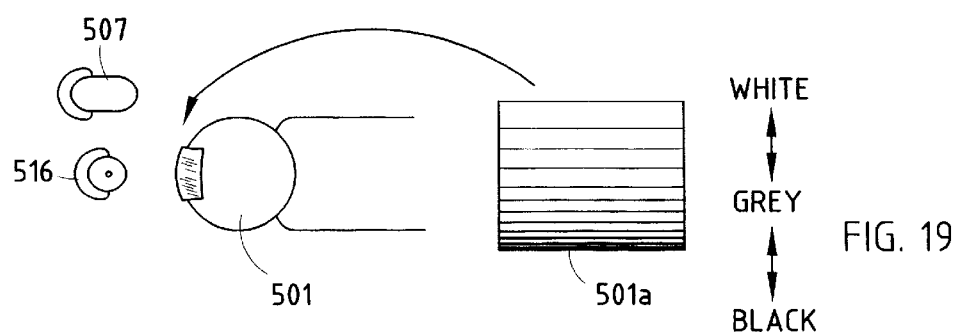
FIG. 19 is a perspective view of a tilt detector constructed in accordance with a fifth embodiment of the present invention.

FIG. 19 shows a fifth embodiment of the present invention in which only a single LED 507 is utilized. Again, such an embodiment offers the advantage of reducing the component count and cost of the mirror. Additionally, if only one LED is used, it may be set on 100 percent duty cycle to reduce EMI emissions. As also shown in FIG. 19, target 501a may be configured to vary from black to gray to white in a vertical direction so as to enhance the ability of the tilt detector to determine the degree of movement of the target relative to light sensor 516.

Figure 20:
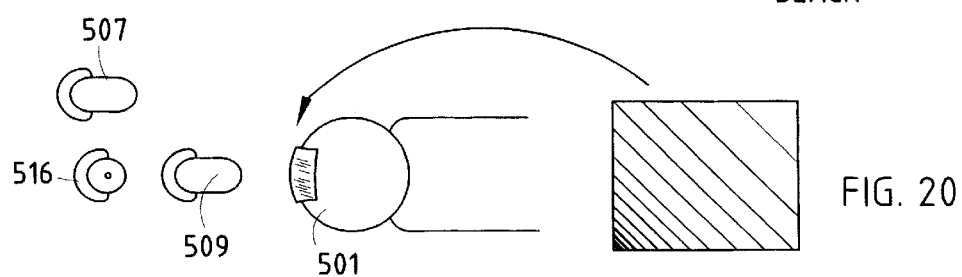
FIG. 20 is a perspective view of a tilt detector constructed in accordance with a sixth embodiment of the present invention.

FIG. 20 shows a sixth embodiment of the present invention, which is similar to the fourth embodiment, with the exception that target 501a may have a gray scale from black to gray to white that is provided diagonally across a square target area. This approach is similar to that used in the fifth embodiment, with the exception that the reflectivity gradation is provided diagonally so as to allow for more accurate detections in both the vertical and horizontal direction.

Figure 21:
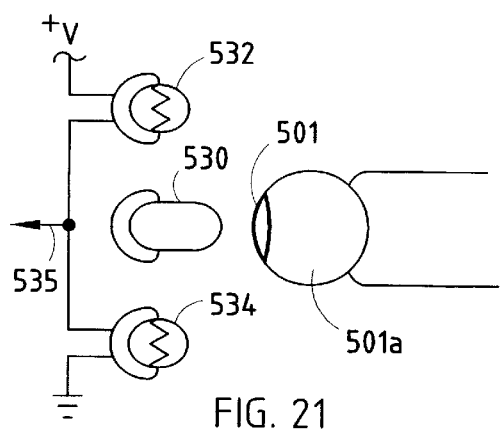
FIG. 21 is a perspective view of a tilt detector constructed in accordance with a seventh embodiment of the present invention.

While the above embodiments utilize a single light sensor and one or more LEDs, the concept may be reversed using a single source of light 530 and a pair of light sensors 532 and 534, which are preferably CdS cells in this embodiment, as illustrated in FIG. 21. In accordance with the seventh embodiment, first light source 532 may be coupled between a positive voltage supply line and the sensor output line 535, while the second light sensor 534 may be coupled between output line 535 and ground. With this configuration, $V_{OUT}$ will vary with tilt position. While only two sensors are shown for sensing vertical tilt, two additional sensors may be supplied for sensing horizontal tilting. It should be noted that when such a construction is utilized, more baffling should be provided to prevent light emitted from LED 530 from reaching the glare and ambient light sensors, which are typically also CdS cells.

Figure 22A:
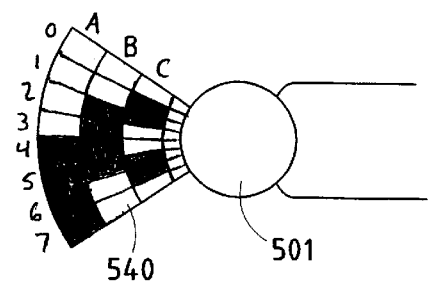
FIG. 22A is a top view of a portion of a tilt detector constructed in accordance with an eighth embodiment of the present invention.
Figure 22B:
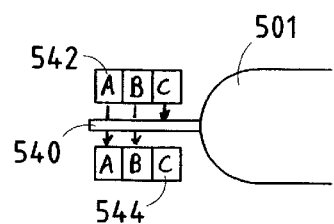
FIG. 22B is a side view of the tilt detector constructed in accordance with the eighth embodiment.

FIGS. 22A and 22B show an eighth embodiment of the tilt detector of the present invention. As shown, a binary Gray code wheel 540 may be secured to ball 501. An emitter array 542 including, for example, three linearly positioned emitters, and a detector array 544 including three corresponding detectors, may be mounted to the printed circuit board such that wheel 540 extends therebetween with sufficient space between emitter array 542 and detector array 544 to allow wheel 540 to move relative to arrays 542 and 544 as the mirror is moved. The Gray code wheel generally has discrete regions that are either of transmissive or non-transmissive. The discrete regions are generally arranged with a plurality of columns and three arcuate rows corresponding to the number of emitters and detectors. Each column includes a unique binary sequence of transmissive/non-transmissive regions such that the detectors can detect which column lies between the emitters and detectors. By identifying the column, the degree of movement of the wheel (and hence the mirror) in one plane may be determined. An exemplary coding scheme is illustrated in FIG. 22A and represented in Table I below. This same approach could be used using a grey scale disk.

TABLE I

| Absolute Position | Gray Code | | |
|---|---|---|---|
| X | A | B | C |
| 0 | 0 | 0 | 0 |
| 1 | 0 | 0 | 1 |
| 2 | 0 | 1 | 1 |
| 3 | 0 | 1 | 0 |
| 4 | 1 | 1 | 0 |
| 5 | 1 | 1 | 1 |
| 6 | 1 | 0 | 1 |
| 7 | 1 | 0 | 0 |

Figure 23:
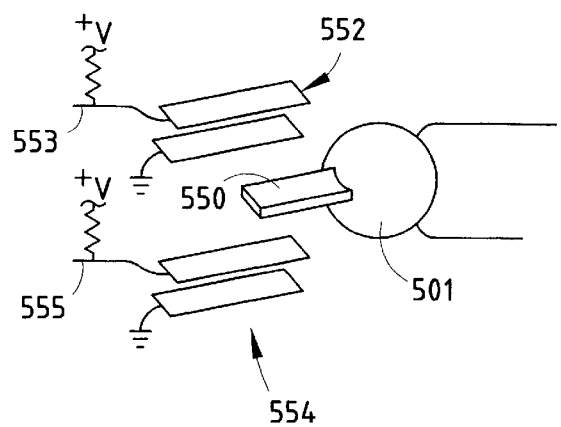
FIG. 23 is a perspective view of a tilt detector constructed in accordance with a ninth embodiment of the present invention.

FIG. 23 illustrates a ninth embodiment of the tilt detector of the present invention. As illustrated, a paddle 550 is attached to ball 501, which extends between a pair of leaf switches 552 and 554. As apparent, when the mirror is tilted down, paddle 550 moves towards leaf switch 552 and eventually presses the lower contact of switch 552 against the upper contact thereby producing a change in voltage at the output line 553 associated with switch 552. Similarly, if the mirror is tilted vertically upward, paddle 550 presses downward on the upper contact of leaf switch 554 until it comes into contact with the lower contact and thereby causes a voltage to be detected on output line 555. Thus, this implementation provides three discrete positions—up, down, and center. This configuration could be improved by stacking a plurality of such leaf switches to provide more resolution as to the amount of tilting since leaf switches stacked closer to paddle 550 would become activated prior to those towards the outside depending on the degree of vertical tilting of the mirror.

Figure 24A:
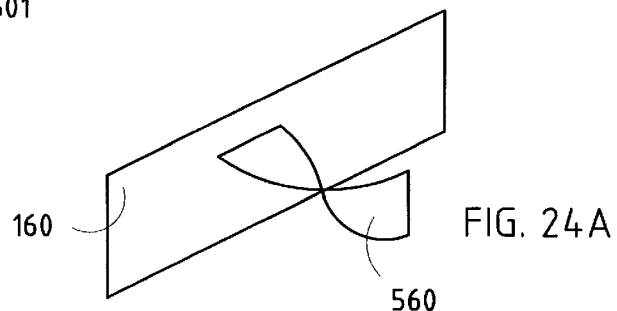
FIG. 24A is a perspective view of a portion of a tilt detector constructed in accordance with a tenth embodiment of the present invention.
Figure 24B:
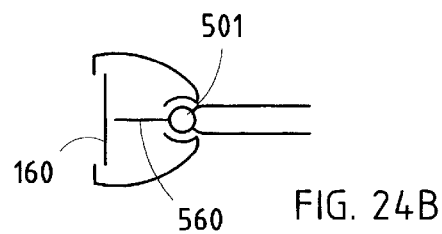
FIG. 24B is a side view of the tilt detector constructed in accordance with the tenth embodiment.
Figure 24C:
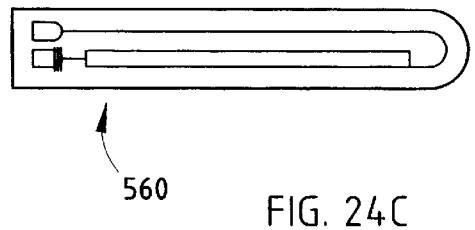
FIG. 24C is a side view of an exemplary flex sensor as used in the tenth embodiment of the present invention.

FIGS. 24A–24C illustrate a tenth embodiment of the tilt detector of the present invention. This embodiment utilizes a flex sensor, such as the variable resistor flex sensors disclosed in U.S. Pat. Nos. 5,157,372 and 5,309,135, the disclosures of which are incorporated herein by reference. As illustrated, flex sensor 560 is secured at one end to circuit board 160 and secured at its other end to ball 501. Ideally, the edges of the flex sensor are secured to circuit 160 and ball 501, such that the edges run perpendicular to one another with the flex surface twisted 90 degrees. This twisting of the flex sensor allows sensing of a change in both vertical and horizontal tilting. While this approach does not differentiate the access of motion, it can indicate that the position of the mirror has changed and thereby enable the compass processing circuit to compensate or recalibrate in the manner discussed above.

Figure 25A:
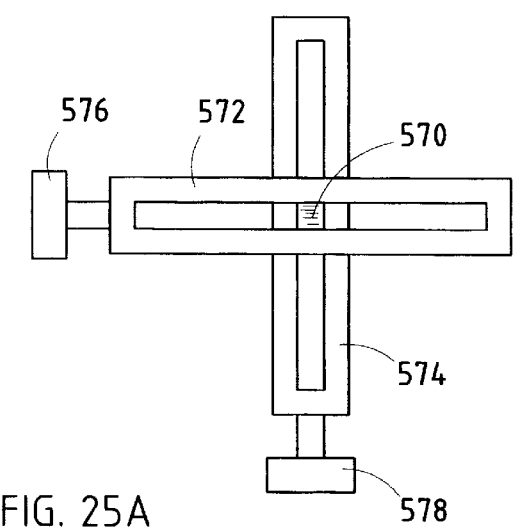
FIG. 25A is a side view of a tilt detector constructed in accordance with an eleventh embodiment of the present invention.
Figure 25B:
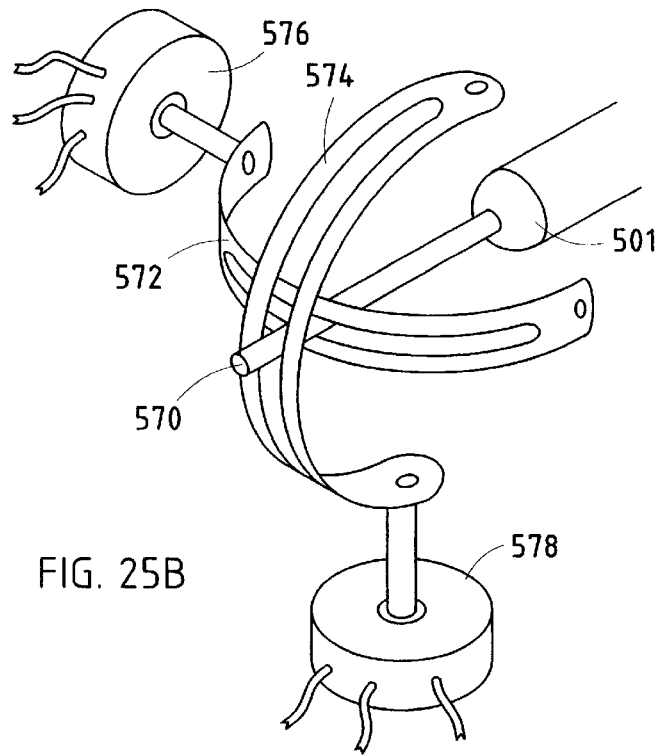
FIG. 25B is a perspective view of the tilt detector shown in FIG. 25A.

FIGS. 25A and 25B illustrate an eleventh embodiment of the tilt detector of the present invention. Basically, this tilt detector is that commonly employed for joystick-type assemblies model airplane remote controls and the like. As illustrated, ball 501 would be equipped with a shaft 570 that extends between a pair of perpendicularly arranged semi-circular actuators 572 and 574. Semi-circular actuators 572 and 574 include an elongated slot through which rod 570 extends. Actuators 572 and 574 are mounted so as to be capable of rotation about respective horizontal and vertical axes. As the mirror is rotated horizontally, for example, rod 570 slides within the elongated slot of the horizontally disposed semi-circular actuator 572 while actuator 574 is rotated. A potentiometer 578 may sense rotation of vertical actuator 574 as a result of horizontal tilting of the mirror. Similarly, when the mirror is tilted vertically, rod 570 slides within the elongated slot of the vertically disposed semi-circular actuator 574 while actuator 572 is rotated. The degree of rotation of actuator 572 may then be sensed by a potentiometer 576 provided at one end of actuator 572. The amount of rotation may then be delivered to the compass processing circuit for use in compensating the compass readings.

Figure 26:
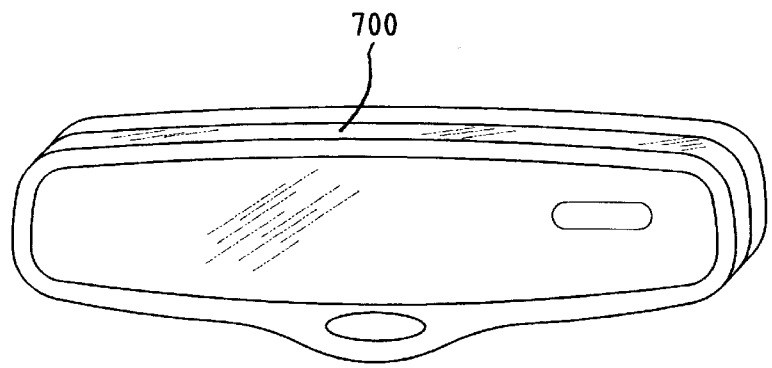
FIG. 26 is a perspective view of a rearview mirror constructed in accordance with a twelfth embodiment of the present invention.

FIG. 26 illustrates a twelfth embodiment of the tilt detector of the present invention. As illustrated in FIG. 26, a proximity sensor 700 is provided about the periphery of mirror housing 120. Such a proximity sensor could be provided using capacitive touch switches such as those disclosed in U.S. Pat. No. 5,594,222, for example. While such a proximity sensor is different from the above embodiments in that it does not detect actual movement of the mirror, sensor 700 can detect when the mirror has been touched and hence presume that it is likely that the mirror has been tilted when the compass sensors sense a sudden shift in the vehicle direction. One advantage of this approach is that it will work on either a single ball or a double ball mount. When this embodiment is utilized, it is preferable that sensor 700 is provided with power to detect if the mirror has been moved when the vehicle ignition has been turned off. This can be accomplished by using low power components and maintaining a connection to the vehicle battery power at all times or at least when the vehicle ignition is off or using any other conventional methods for the supply of power when the vehicle ignition is off.

Yet another embodiment of the tilt detector of the present invention is to utilize the outputs of the potentiometers of a memory mirror automatic positioning mechanism when it is present in the rearview mirror assembly. Such mechanisms are already configured to detect the exact position of a mirror so that they may automatically return the mirror to any memorized position.

While the effect of vertical tilt of a mirror with respect to the sensors has been described above as creating a shift of the origin of the circular plot of data along the Y axis only, vertical tilting, and particularly horizontal tilting, can also cause shifting of the calibration circle's origin in the X direction when non-uniform magnetic fields are present within the vehicle. For example, if the magnetic field sensors are disposed near the edge of the mirror that is closest to the passenger side of the vehicle and if the mirror is tilted horizontally to a significant degree, the sensors may be moved to a different position within the vehicle where the effects of the vehicle on the sensed magnetic field may be different from the prior position. This may be due to variations in sheet metal, wiring, and spot welds. The single largest contributor to this variation, however, is the permanent magnets in the motor pack for some sunroofs. Thus, in the example stated above, the magnetic sensors might be moved closer or farther from the permanent magnets of the sunroof motor when the mirror is horizontally or vertically tilted. To reduce the effect of such field non-uniformity, the physical displacement of the sensors can be minimized and thereby minimize the calibration center point movement by positioning the sensors closest to the center of rotation of the mirror. While it may not be physically practical to place the sensors at the exact center of rotation, placing the sensors as close as possible to the pivot point does minimize the likelihood that the sensors will be subjected to variations in the magnetic field by their movement to different positions within the vehicle. Furthermore, if the variation of the field in the vehicle was predictable, as would be the case if there is little vehicle-to-vehicle variation, one could place the X or Y sensor that is subjected to the highest field variation closest to the pivot point.

An alternative or additional approach to reduce the effects of a non-uniform magnetic field within the vehicle is to require a minimum change in position and a minimum change in field. This is because there is no guarantee that the magnetic field is stable when the mirror is tilted. Most people adjust their mirrors while stopped, or in straight travel, but variations in field strength can be caused by metal reinforcements in the road, windshield wiper noise effects, etc. Requiring a change of 2 to 3 degrees in tilt and/or rotation, and 50 mG field change may be typical, but this may vary based on vehicle field variations and noise sources and shielding effects. Excessive shifting of the point is likely to accumulate error.

Yet another embodiment of the tilt detector of the present invention is to provide an electronic inclinometer 76 (FIG. 7A) within the interior rearview mirror. This inclinometer may then be used to directly measure the degree of tilt of the mirror and provide this information to the compass processing circuit for use in compensating for the degree of inclination. Although inclinometers may be more expensive than some of the other approaches discussed above, the inclinometer may serve other purposes. For example, the inclinometer may measure the amount of pitch and roll the vehicle is experiencing. This information can be used to give a "roll over" warning indication to the driver. Also, this information may be used in conjunction with an accelerometer for vehicle dynamic control, and/or used to adjust suspension for heavily loaded vehicles. Additionally, this information can be used as an "anti-jack" sensor as part of a vehicle security system. Electronic circuitry that includes the inclinometer, which may be solid-state or electrochemical, may be placed in a housing at the foot portion of the mirror mounting bracket so as to allow for a stationary position. Power may be supplied from the electronics inside the mirror, and the inclinometer output may be sent to the circuitry inside the mirror for processing. Further, such information may be provided to other electronic vehicle components over a vehicle bus. Preferably, the inclinometer is mounted inside the mirror housing so that it may be used to detect the tilting of the mirror.

A second inclinometer may also be used and implemented in the foot portion of the rearview mirror mounting bracket. By including an inclinometer in both the foot of the mirror and within the mirror housing, the relative inclinations sensed by the inclinometers may be compared to differentiate between tilting of the mirror housing and travel up or down a hill.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A rearview mirror assembly for a vehicle comprising:
   a mirror housing;
   a mounting structure for pivotably mounting said mirror housing to the vehicle such that said mirror housing may be both vertically and horizontally tilted;
   a mirror mounted in said mirror housing;
   a compass sensor disposed in said mirror housing and coupled to a compass processing circuit; and
   a tilt detector for detecting when said mirror housing has been tilted from a prior position and for generating and transmitting a tilt detection signal to the compass processing circuit.

2. The rearview mirror assembly as defined in claim 1, wherein the compass processing circuit is disposed in said mirror housing as a component of the rearview mirror assembly.

3. The rearview mirror assembly as defined in claim 2 and further including a display mounted in said mirror housing and coupled to the compass processing circuit for receiving a display signal therefrom indicating the current heading of the vehicle.

4. The rearview mirror assembly as defined in claim 1, wherein said tilt detector comprises a flex sensor coupled between a ball of said mounting structure and a circuit board mounted in said mirror housing, said flex sensor generates said tilt detection signal when flexed as a result of pivoting of said mirror housing relative to said mounting structure.

5. The rearview mirror assembly as defined in claim 1, wherein said tilt detector comprises a proximity sensor positioned about the outer periphery of said mirror housing for detecting touching of said mirror housing and generating said tilt detection signal when said mirror housing is touched.

6. The rearview mirror assembly as defined in claim 5, wherein said proximity sensor is a capacitively coupled switch.

7. The rearview mirror assembly as defined in claim 1, wherein said tilt detector comprises an electronic inclinometer mounted in said mirror housing for detecting movement of said mirror housing.

8. The rearview mirror assembly as defined in claim 1, wherein said tilt detector comprises at least one memory position potentiometer of an automatic mirror position adjustment mechanism.

9. The rearview mirror assembly as defined in claim 1, wherein said tilt detector comprises a Gray code wheel extending from a ball mount of said mounting structure and positioned between an array of light emitters and an array of light detectors that are mounted in said mirror housing, whereby a tilt detection signal is generated when at least one of said light detectors detects a change of light levels that results when said Gray code wheel moves relative to said arrays.

10. The rearview mirror assembly as defined in claim 1, wherein said tilt detector comprises a paddle extending from a ball mount of said mounting structure and positioned between a pair of leaf switches that are mounted in said mirror housing, whereby a tilt detection signal is generated when one of said leaf switches is moved into a closed position when said paddle moves and pushes the leaf switch into a closed position.

11. The rearview mirror assembly as defined in claim 1, wherein said tilt detector comprises at least one light source and a photosensor for sensing light emitted from said light source.

12. The rearview mirror assembly as defined in claim 1, wherein said tilt detector detects the tilting of a vehicle rearview mirror housing relative to a ball mount structure upon which the housing may be tilted, said tilt detector comprises:
   a target provided on an area of the ball mount structure, said target having a different visual characteristic than other surrounding areas of the ball mount structure;
   a light source for projecting light onto the ball mount structure;
   a photodetector for detecting the level of light reflected from the ball mount structure; and a processing circuit coupled to said photodetector for sensing when the level of reflected light detected by said photodetector changes, and for generating a tilt detection signal when a change is sensed.

13. The rearview mirror assembly as defined in claim 12, wherein said ball mount structure includes a protruding target area on which said target is provided.

14. The rearview mirror assembly as defined in claim 1, wherein said tilt detector comprises a potentiometer mounted in said mirror housing for sensing rotation of an actuator that is operatively coupled to a ball mount of said mounting structure, wherein said actuator rotates when said mirror housing is tilted vertically and said potentiometer generates said tilt detection signal in response to rotation of said actuator.

15. The rearview mirror assembly as defined in claim 14, wherein said tilt detector further comprises a second potentiometer mounted in said mirror housing for sensing rotation of a second actuator that is operatively coupled to a ball mount of said mounting structure, wherein said second actuator rotates when said mirror housing is tilted horizontally and said second potentiometer generates said tilt detection signal in response to rotation of said second actuator.

16. A rearview mirror assembly for a vehicle comprising:

a housing;

a mounting structure for pivotably mounting said housing to the vehicle such that said housing may be both vertically and horizontally tilted;

a mirror mounted in said housing;

a tilt detector for detecting when said housing has been tilted from a prior position and for generating a tilt detection signal when said detector detects tilting of said housing;

a compass sensor circuit disposed in said housing for sensing directional components of the earth's magnetic field and for supplying electrical signals representing the sensed directional components; and a compass processing circuit disposed in said housing and coupled to said compass sensor circuit for processing the electrical signals supplied by said compass sensor circuit and generating a vehicle heading signal representing the current heading of the vehicle, wherein said compass processing circuit is coupled to said tilt detector to receive the tilt detection signal.

17. The rearview mirror assembly as defined in claim 16, wherein when said processing circuit receives a tilt detection signal, said processing circuit immediately recalibrates by an amount of any change in the directional components sensed by said compass sensors that is detected immediately before and immediately after the tilt detection signal is received.

18. The rearview mirror assembly as defined in claim 16, wherein said tilt detector detects the tilting of a vehicle rearview mirror housing relative to a ball mount structure upon which the housing may be tilted, said tilt detector comprises:

a target provided on an area of the ball mount structure, said target having a different visual characteristic than other surrounding areas of the ball mount structure;

a light source for projecting light onto the ball mount structure;

a photodetector for detecting the level of light reflected from the ball mount structure; and a processing circuit coupled to said photodetector for sensing when the level of reflected light detected by said photodetector changes, and for generating a tilt detection signal when a change is sensed.

19. A tilt detector for a rearview mirror assembly for detecting the tilting of the rearview mirror housing relative to a ball mount structure upon which the housing may be tilted, said tilt detector comprises:

a target provided on an area of the ball mount structure, said target having a different visual characteristic than other surrounding areas of the ball mount structure;

a light source for projecting light onto the ball mount structure;

a photodetector for detecting the level of light reflected from the ball mount structure; and a processing circuit coupled to said photodetector for sensing when the level of reflected light detected by said photodetector changes, and for generating a tilt detection signal when a change is sensed.

20. The tilt detector as defined in claim 19 and further including at least one additional light source for projecting light onto the ball mount structure, said light sources being sequentially activated to enable said processing circuit to separately read the levels of reflected light detected by said photodetector for each of said light sources and thereby determine whether the mirror housing has been tilted.

21. The tilt detector as defined in claim 20, wherein said light sources are light emitting diodes.

22. The tilt detector as defined in claim 21, wherein said light emitting diodes emit infrared light.

23. The tilt detector as defined in claim 19 and further including at least one additional photodetector for detecting the level of light reflected from the ball mount structure, said photodetectors are coupled to said processing circuit to enable said processing circuit to separately read the levels of reflected light detected by said photodetectors and thereby determine whether the mirror housing has been tilted.

24. The tilt detector as defined in claim 19, wherein said ball mount structure includes a protruding target area on which said target is provided.

25. The tilt detector as defined in claim 24, wherein said protruding target area includes a substantially flat, diffuse reflecting area serving as said target.

26. The tilt detector as defined in claim 25, wherein said protruding target area has beveled edges.

27. The tilt detector as defined in claim 25, wherein said light source is positioned so that it is approximately in the plane of the surface of said target when the mirror is near an extreme of travel on the ball mount structure.

28. The tilt detector as defined in claim 27, wherein, as said light source rotates farther away from the plane of said target, a gradually increasing amount of light from said light source is intercepted by said target and sensed by said photosensor.

29. The tilt detector as defined in claim 25 and farther including at least one additional light source for projecting light onto the ball mount structure, said light sources being sequentially activated to enable said processing circuit to separately read the levels of reflected light detected by said photodetector for each of said light sources and thereby determine whether the mirror housing has been tilted.

30. The tilt detector as defined in claim 29, wherein said light sources are light emitting diodes.

31. The tilt detector as defined in claim 30, wherein said light emitting diodes emit infrared light.

32. A rearview mirror assembly comprising:

a mirror housing;

a mounting structure for mounting said mirror housing in a vehicle;

a mirror disposed in said housing;

an inclinometer disposed in said mirror housing for sensing tilting of said mirror housing; and a processing circuit disposed in said housing and coupled to said inclinometer for processing information received from said inclinometer.

33. The rearview mirror assembly as defined in claim 32 and further including a compass sensor disposed in said mirror housing and coupled to a compass processing circuit, wherein said inclinometer generates and transmits a tilt detection signal to the compass processing circuit when said mirror housing is tilted.

34. The rearview mirror assembly as defined in claim 33, wherein said processing circuit generates a rollover warning in response to information received from said inclinometer.

35. The rearview mirror assembly as defined in claim 32 and further including a second inclinometer for sensing pitch and roll of the vehicle.

36. The rearview mirror assembly as defined in claim 35, wherein said processing circuit generates a rollover warning in response to information received from said second inclinometer.

37. The rearview mirror assembly as defined in claim 35, wherein said second inclinometer is mounted in said mounting portion.

38. The rearview mirror assembly as defined in claim 35, wherein said processing circuit compares the relative inclinations sensed by both inclinometers to differentiate between tilting of said mirror housing and travel up or down a hill.

* * * * *